(12) United States Patent
Wang et al.

(10) Patent No.: US 10,382,770 B2
(45) Date of Patent: Aug. 13, 2019

(54) MULTI-LEVEL MACHINE LEARNING-BASED EARLY TERMINATION IN PARTITION SEARCH FOR VIDEO ENCODING

(71) Applicant: GOOGLE LLC, Mountain View, CA (US)

(72) Inventors: Yunqing Wang, Palo Alto, CA (US); Xintong Han, Greenbelt, MD (US); Yang Xian, Forest Hills, NY (US)

(73) Assignee: GOOGLE LLC, Mountain View, CA (US)

( * ) Notice: Subject to any disclaimer, the term of this patent is extended or adjusted under 35 U.S.C. 154(b) by 101 days.

(21) Appl. No.: 15/425,362

(22) Filed: Feb. 6, 2017

(65) Prior Publication Data

US 2018/0227585 A1    Aug. 9, 2018

(51) Int. Cl.
| | |
|---|---|
| *H04N 7/12* | (2006.01) |
| *H04N 11/02* | (2006.01) |
| *H04N 11/04* | (2006.01) |
| *H04N 19/192* | (2014.01) |
| *H04N 19/176* | (2014.01) |
| *H04N 19/503* | (2014.01) |
| *H04N 19/66* | (2014.01) |
| *H04N 19/119* | (2014.01) |
| *H04N 19/96* | (2014.01) |
| *H04N 19/136* | (2014.01) |

(52) U.S. Cl.
CPC ......... *H04N 19/192* (2014.11); *H04N 19/119* (2014.11); *H04N 19/136* (2014.11); *H04N 19/176* (2014.11); *H04N 19/503* (2014.11); *H04N 19/66* (2014.11); *H04N 19/96* (2014.11)

(58) Field of Classification Search
None
See application file for complete search history.

(56) References Cited

U.S. PATENT DOCUMENTS 8,010,471 B2 * 8/2011 Zhang ............... G06K 9/00288
706/12

OTHER PUBLICATIONS

Hu Qiang et al, "Fast HEVC intra mode decision based on logistic regression classification", 2016 IEEE International Symposium on Broadband Multimedia Systems and Broadcasting (BMSB), IEEE, Jun. 1, 2016, pp. 1-4 (Year: 2016).*

(Continued)

*Primary Examiner* — Chikaodili E Anyikire
(74) *Attorney, Agent, or Firm* — Young Basile Hanlon & MacFarlane, P.C.

(57) ABSTRACT

Described herein are classifiers that are used to determine whether or not to partition a block in frame during prediction using recursive partitioning. Blocks of training video frames are encoded using recursive partitioning to generate encoded blocks. Training instances are generated for the encoded blocks that include values of features extracted from each encoded block and a label indicating whether or not the encoded block is partitioned into smaller blocks in the recursive partitioning. The classifiers are trained for different block sizes using the training instances associated with the block size as input to a machine-learning process. When encoding frames of a video sequence, the output of the classifiers determines whether input blocks are partitioned during encoding.

17 Claims, 12 Drawing Sheets

(56) References Cited

OTHER PUBLICATIONS

Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
International Search Report and Written Opinion in PCT/US2017/059280, dated Mar. 5, 2018.
Hu et al., "Fast HEVC Intra Mode Decision based on Logistic Regression Classification", 2016 IEEE International Symposium on Broadband Multimedia Systems and Broadcasting, Jun. 1, 2016, 4 pgs.
Shen et al., "CU splitting early termination based on weighted SVM", EURASIP Journal on Image and Video Processing, vol. 2013, No. 1, Jan. 1, 2013, pp. 1-11.
Zhang et al., "Machine Learning-Based Coding Unit Depth Decisions for Flexible Complexity Allocation in High Efficiency Video Coding", IEEE Transactions on Image Processing, vol. 24, No. 7, Jul. 1, 2015, pp. 2225-2238.
Zhang et al., "Fast Intra-Mode and CU Size Decision for HEVC", IEEE Transactions on Circuits and Systems for Video Technology, vol. 27, No. 8, Aug. 1, 2017, pp. 1714-1726.

\* cited by examiner

| Training Instance | BLOCK | Feature 1 | ... | Feature K | LABEL |
|---|---|---|---|---|---|
| 1 | N x N | $V_{11}$ | ... | $V_{1K}$ | 0 |
| 2 | N/2 x N/2 (A) | $V_{21}$ | ... | $V_{2K}$ | 0 |
| 3 | N/2 x N/2 (B) | $V_{31}$ | ... | $V_{3K}$ | 1 |
| 4 | N/2 x N/2 (C) | $V_{41}$ | ... | $V_{4K}$ | 1 |
| 5 | N/2 x N/2 (D) | $V_{51}$ | ... | $V_{5K}$ | 0 |
| 6 | N/4 x N/4 (A0) | $V_{61}$ | ... | $V_{6K}$ | 1 |
| 7 | N/4 x N/4 (A1) | $V_{71}$ | ... | $V_{7K}$ | 1 |
| 8 | N/4 x N/4 (A2) | $V_{81}$ | ... | $V_{8K}$ | 1 |
| 9 | N/4 x N/4 (A3) | $V_{91}$ | ... | $V_{9K}$ | 0 |
| 10 | N/4 x N/4 (D0) | $V_{101}$ | ... | $V_{10K}$ | 1 |
| 11 | N/4 x N/4 (D1) | $V_{111}$ | ... | $V_{11K}$ | 1 |
| 12 | N/4 x N/4 (D2) | $V_{121}$ | ... | $V_{12K}$ | 1 |
| 13 | N/4 x N/4 (D3) | $V_{131}$ | ... | $V_{13K}$ | 1 |
| 14 | N x N | $V_{141}$ | ... | $V_{14K}$ | 0 |
| 15 | N/2 x N/2 (A) | $V_{151}$ | ... | $V_{15K}$ | 0 |
| 16 | N/2 x N/2 (B) | $V_{161}$ | ... | $V_{16K}$ | 0 |
| 17 | N/2 x N/2 (C) | $V_{171}$ | ... | $V_{17K}$ | 0 |
| 18 | N/2 x N/2 (D) | $V_{181}$ | ... | $V_{18K}$ | 0 |
| 19 | N/4 x N/4 (C0) | $V_{191}$ | ... | $V_{19K}$ | 1 |
| 20 | N/4 x N/4 (C1) | $V_{201}$ | ... | $V_{20K}$ | 1 |
| 21 | N/4 x N/4 (C2) | $V_{211}$ | ... | $V_{21K}$ | 1 |
| 22 | N/4 x N/4 (C3) | $V_{221}$ | ... | $V_{22K}$ | 0 |
| 23 | N/4 x N/4 (D0) | $V_{231}$ | ... | $V_{23K}$ | 1 |
| 24 | N/4 x N/4 (D1) | $V_{241}$ | ... | $V_{24K}$ | 1 |
| 25 | N/4 x N/4 (D2) | $V_{251}$ | ... | $V_{25K}$ | 1 |
| 26 | N/4 x N/4 (D3) | $V_{261}$ | ... | $V_{26K}$ | 1 |

FIG. 11

MULTI-LEVEL MACHINE LEARNING-BASED EARLY TERMINATION IN PARTITION SEARCH FOR VIDEO ENCODING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for video coding using an early termination for partition searching based on multi-level machine learning.

An aspect of a method described herein includes generating, using recursive partitioning, encoded blocks by encoding a training video frame multiple times using different sets of encoding options. The method also includes, for multiple encoded blocks having a first size, extracting, from an encoded block having the first size, training values for block features from a defined feature set, and associating a label with a training instance formed of the training values that indicates whether the encoded block having the first size is partitioned into smaller blocks. Finally, a first classifier is trained using the training instances for the multiple encoded blocks having the first size, the first classifier determining whether a first block having the first size is to be further partitioned during encoding using values for at least some of the block features obtained from the block.

An aspect is an apparatus described herein includes a non-transitory memory and a processor. The processor is configured to execute instructions stored in the memory to encode blocks of training video frames using recursive partitioning to generate encoded blocks, generate training instances for the encoded blocks, each training instance comprising values of block features extracted from an encoded block and a label indicating whether or not the encoded block is partitioned into smaller blocks in the recursive partitioning, and train classifiers for different block sizes, each classifier for a block size trained using the training instances associated with the block size as input to a machine-learning process, and each classifier configured to determine whether an input block is to be partitioned during encoding.

Another aspect is an apparatus where the processor is configured to execute instructions stored in the memory to select a block of a video frame having a largest prediction block size, encode the block without partitioning the block, extract values from the block based on a predetermined feature set, apply a first classifier to the block using the values as input, the first classifier being a binary classifier for blocks having the largest prediction block size, the binary classifier having a first output indicating to stop a partition search and a second output indicating to continue the partition search, and upon a condition that the first classifier produces the first output for the block, including the block encoded without partitioning in an encoded video bitstream Variations in these and other aspects will be described in additional detail hereafter.

BRIEF DESCRIPTION OF THE DRAWINGS

The description herein makes reference to the accompanying drawings wherein like reference numerals refer to like parts throughout the several views.

FIG. 11 is a diagram of feature extraction using the portion of the frame of FIGS. 10A and 10B as partitioned.

DETAILED DESCRIPTION

Figure 1:
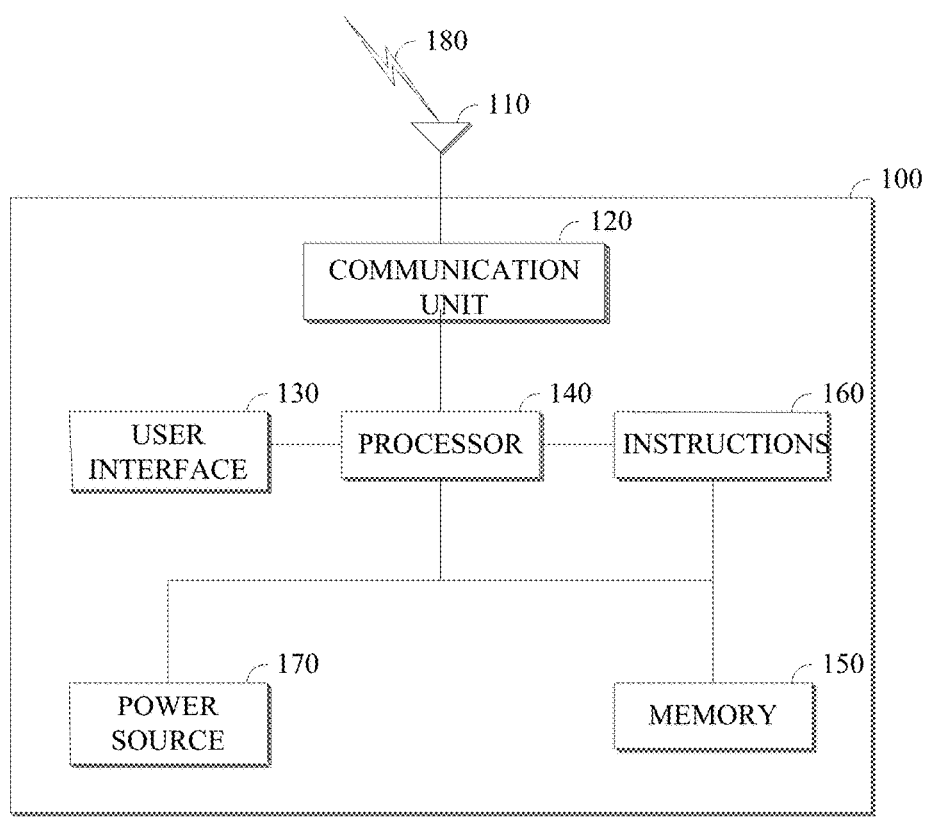
FIG. 1 is a diagram of a computing device in accordance with implementations of this disclosure.

Video compression schemes may include breaking each image, or frame, into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy, or a combination thereof.

Temporal redundancy may be reduced by using similarities between frames to encode a frame using a relatively small amount of data based on one or more reference frames, which may be previously encoded, decoded, and reconstructed frames of the video stream.

Reducing temporal redundancy may include partitioning a block of a frame, identifying a prediction block from a reference frame corresponding to each partition, and determining a difference between the partition and the prediction block as a residual block. Reducing spatial redundancy may include partitioning a block of a frame, identifying a prediction block from the current frame corresponding to each partition, and determining a difference between the partition and the prediction block as a residual block. The residual block is then transformed into the frequency domain using a transform that is the same size, smaller, or larger, than the partition.

A video codec can adopt a broad range of partition sizes. For example, an encoding unit such as a block (sometimes called a superblock) having a size of 64×64 pixels can be recursively decomposed all the way down to blocks having sizes as small as 4×4 pixels. An exhaustive search can be done in order to find the optimal partitioning of the encoding unit. In this partition search, the encoder performs the encoding process for each possible partitioning, and the optimal one may be selected by the lowest error value. For example, a rate-distortion (RD) error or cost may be used, e.g., the partitioning that gives the lowest RD cost is selected. While encoding quality is ensured, this technique is computationally complex and consumes substantial computing resources.

To speed up the encoding process, a threshold-based technique may be used that establishes termination criteria for early termination of the partition search. The criteria are used to evaluate the partition node to see if the current partition size is acceptable as the final choice. If so, its child nodes are not analyzed. The search is terminated for the branch. This remains a computationally expensive process, especially for high definition (HD) clips.

In contrast, the teachings herein describe a multi-level machine learning-based early termination scheme that speeds up the partition search process without sacrificing quality. Machine learning is used to train classifiers at block size levels. The classifier determines, for given a partition node, whether to continue the search down to its child nodes, or to perform early termination and take the current block size as the final one. The term multi-level is used here to refer to the training of the (e.g., binary) classifiers with different error tolerances (e.g., measured in RD cost increase) according to the block sizes. Additional details to implement a multi-level machine learning-based early termination scheme are discussed below after first discussing environments in which the scheme may be incorporated.

FIG. 1 is a diagram of a computing device 100 in accordance with implementations of this disclosure. A computing device 100 as shown includes a communication interface 110, a communication unit 120, a user interface (UI) 130, a processor 140, a memory 150, instructions 160, and a power source 170. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more elements of the computing device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via the communication medium 180. For example, as shown, the communication unit 120 is operatively connected to an antenna configured to communicate via wireless signals at the communication interface 110. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the computing device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, the communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the computing device 100. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
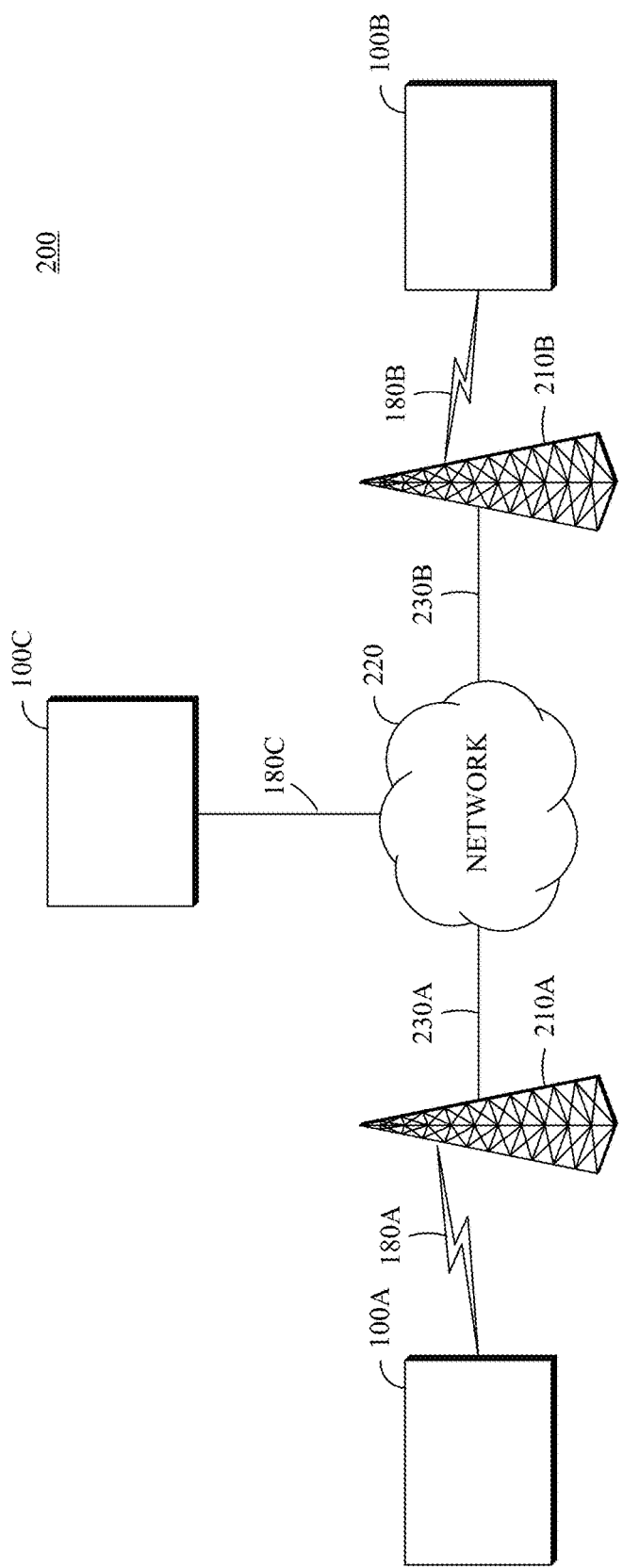
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 is a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C is, for example, a computing device, such as the computing device 100 shown in FIG. 1. As shown, the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C is configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B includes a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 is a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown, the computing and communication devices 100A/100B communicates via wireless communication links 180A/180B, and computing and communication device 100C communicates via a wired communication link 180C. Any of the computing and communication devices 100A/100B/100C may communicate using any wired or wireless communication link, or links. For example, a first computing and communication device 100A communicates via a first access point 210A using a first type of communication link, a second computing and communication device 100B communicates via a second access point 210B using a second type of communication link, and a third computing and communication device 100C communicates via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
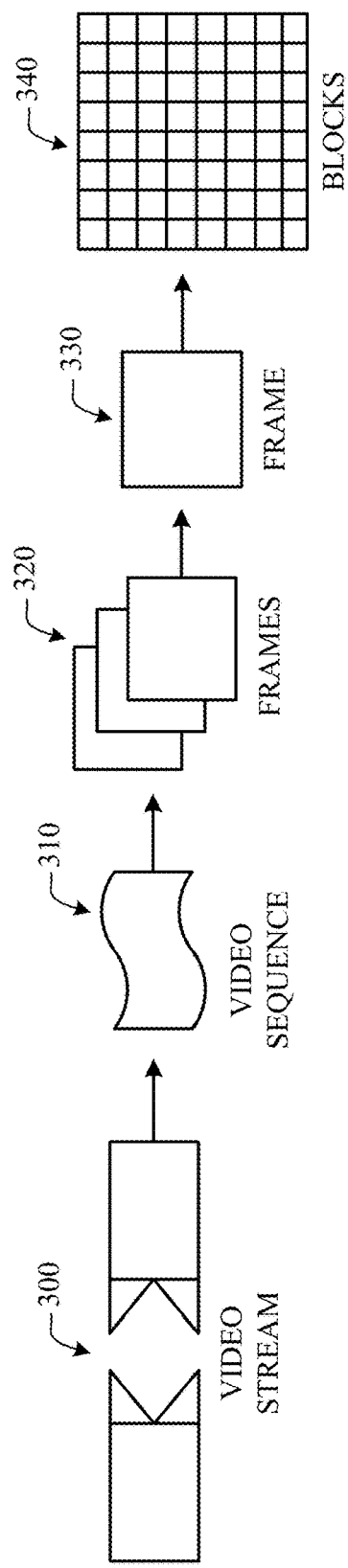
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a sub-block, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
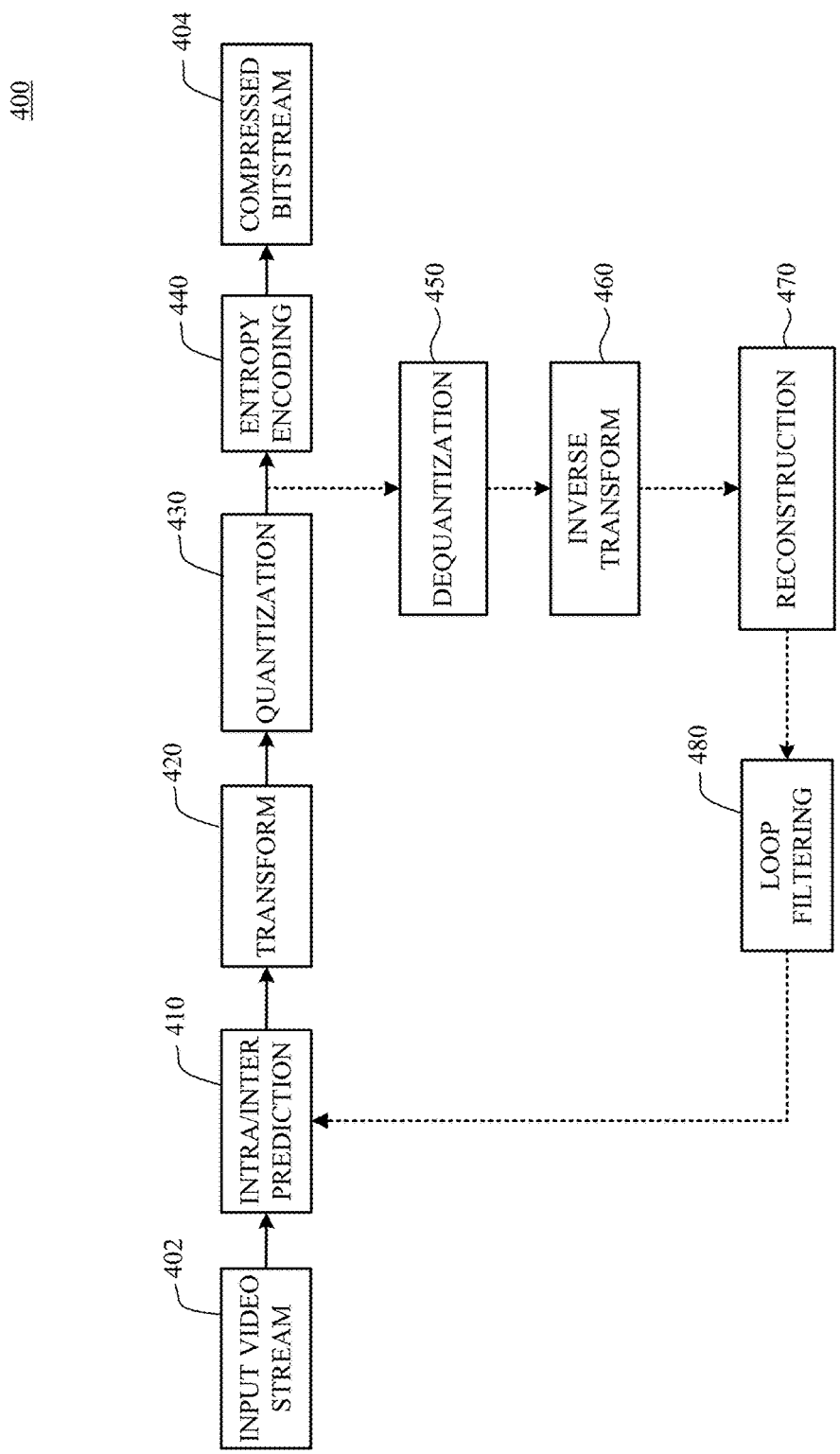
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 subtracts the prediction block from the current block (raw block) to produce a residual block. The transform unit 420 performs a block-based transform, which may include transforming the residual block into transform coefficients in, for example, the frequency domain. Examples of block-based transforms include the Karhunen-Loeve Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e., DC) coefficient at the top-left of the matrix and the highest frequency coefficient at the bottom-right of the matrix.

The quantization unit 430 converts the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
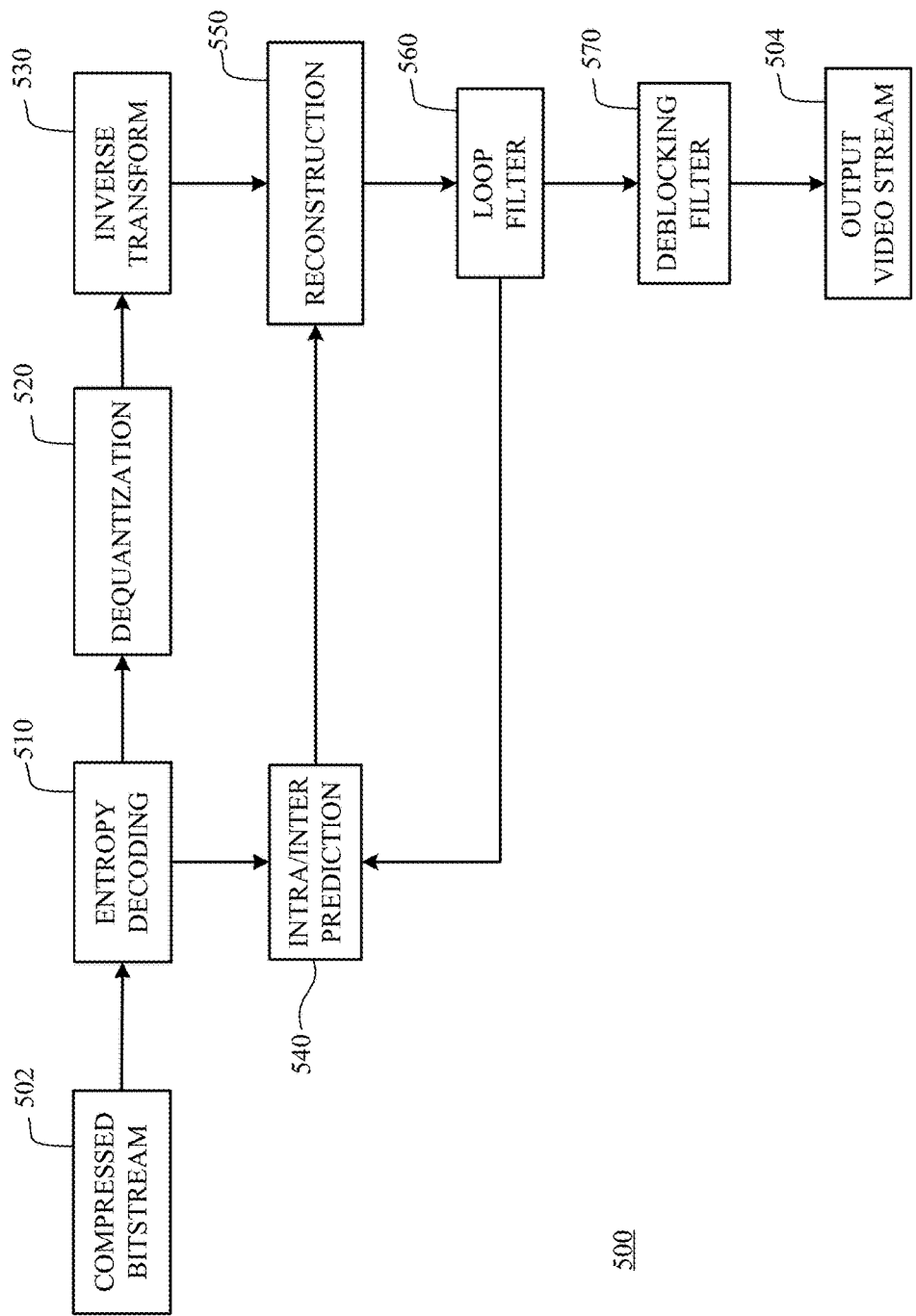
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and here includes dequantizing the quantized transform coefficients at the dequantization unit 450 and inverse transforming the dequantized transform coefficients at the inverse transform unit 460 to produce a derivative residual block. The reconstruction unit 470 adds the prediction block generated by the intra/inter prediction unit 410 to the derivative residual block to create a reconstructed block. The loop filtering unit 480 is applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to decode video data as described herein. The decoder 500 can be implemented as specialized hardware included, for example, in computing device 100.

The decoder 500 receives a compressed bitstream 502, such as the compressed bitstream 404 shown in FIG. 4, and decodes the compressed bitstream 502 to generate an output video stream 504. The decoder 500 as shown includes an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 decodes data elements within the compressed bitstream 502 using, for example, Context Adaptive Binary Arithmetic Decoding, to produce a set of quantized transform coefficients. The dequantization unit 520 dequantizes the quantized transform coefficients, and the inverse transform unit 530 inverse transforms the dequantized transform coefficients to produce a derivative residual block, which may correspond with the derivative residual block generated by the inverse transform unit 460 shown in FIG. 4. Using header information decoded from the compressed bitstream 502, the intra/inter prediction unit 540 generates a prediction block corresponding to the prediction block created in the encoder 400. At the reconstruction unit 550, the prediction block is added to the derivative residual block to create a reconstructed block. The loop filtering unit 560 is applied to the reconstructed block to reduce blocking artifacts. The deblocking filtering unit 570 is applied to the reconstructed block to reduce blocking distortion, and the result is output as the output video stream 504.

Other variations of the decoder 500 can be used to decode the compressed bitstream 502. For example, the decoder 500 can produce the output video stream 504 without the deblocking filtering unit 570.

Figure 6:
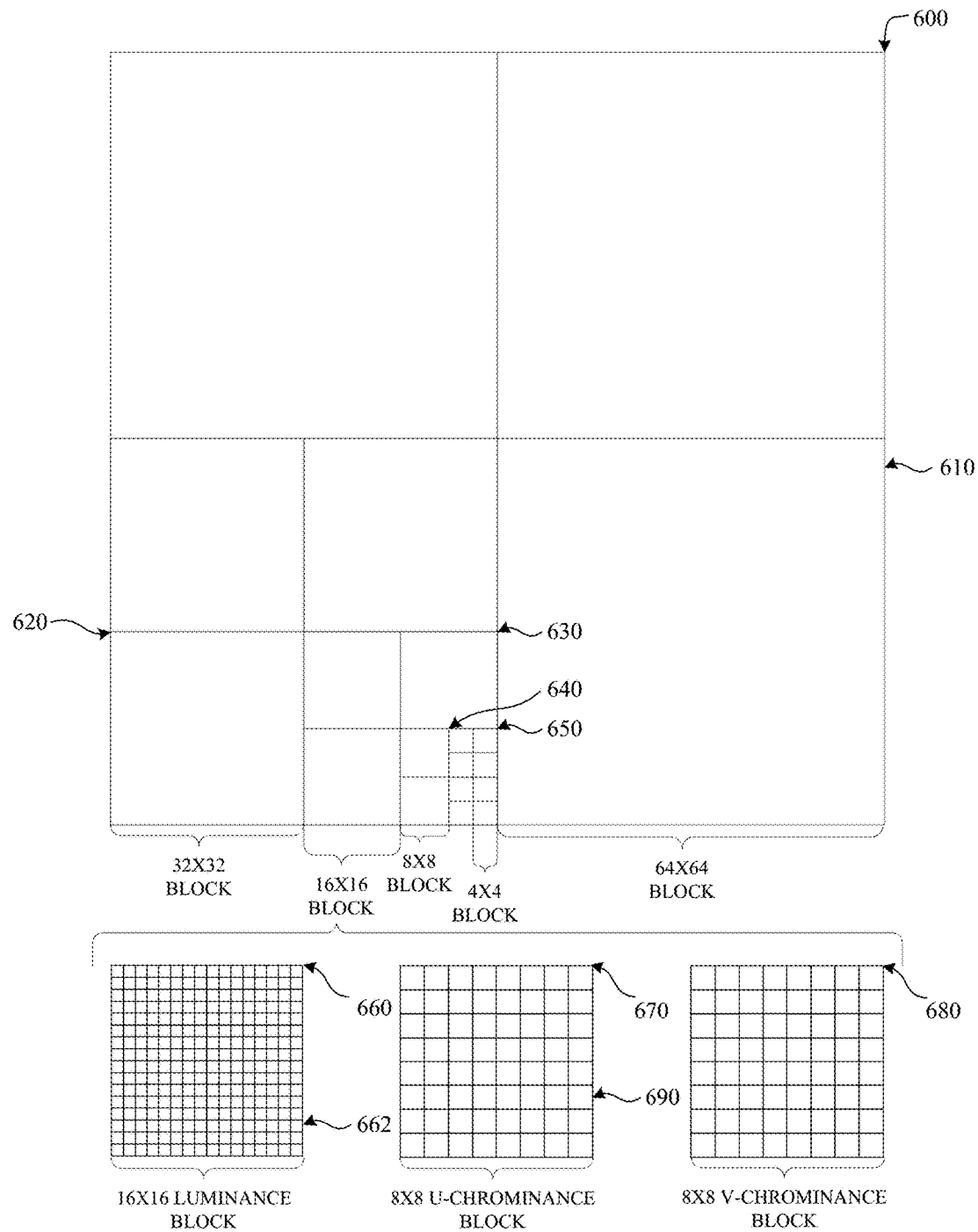
FIG. 6 is a diagram of a portion of a partitioned frame in accordance with implementations of this disclosure.

FIG. 6 is a diagram of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block is a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 includes 16 pixels, which may be represented in four rows and four columns in each respective block in the Cartesian plane or matrix. The pixels include information representing an image captured in the frame, such as luminance information, color information, and location information. In this example, a block, such as a 16×16 pixel block as shown, includes a luminance block 660 comprising luminance pixels 662, and two chrominance blocks, such as a U or Cb chrominance block 670, and a V or Cr chrominance block 680, each comprising chrominance pixels 690. As shown, the luminance block 660 includes 16×16 luminance pixels 662, and each chrominance block 670/680 includes 8×8 chrominance pixels 690 as shown. Although one arrangement of blocks is shown, any arrangement may be used. Although FIG. 6 shows N×N blocks, in some implementations, N×M blocks where N*M may be used. For example, 32×64 blocks, 64×32 blocks, 16×32 blocks, 32×16 blocks, or any other size blocks may be used. In some implementations, N×2N blocks, 2N×N blocks, or a combination thereof may be used.

FIG. 6 shows one example of how four 64×64 blocks may be recursively decomposed using a partition search for video coding. Video coding may include ordered block-level coding. Ordered block-level coding includes coding blocks of a frame in an order, such as raster-scan order, wherein blocks are identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded, and the 64×64 block immediately to the right of the first block may be the second block coded. The second row from the top may be the second row coded, such that the 64×64 block in the left column of the second row is coded after the 64×64 block in the rightmost column of the first row. Other scan orders are possible, including wavefront, horizontal, vertical, etc.

Coding a block can include using quad-tree coding, which may include coding smaller block units (also called sub-blocks) within a block in raster-scan order. For example, the 64×64 block shown in the bottom left corner of the portion of the frame shown in FIG. 6 may be coded using quad-tree coding wherein the top left 32×32 block is coded, then the top right 32×32 block is coded, then the bottom left 32×32 block is coded, and then the bottom right 32×32 block is coded. Each 32×32 block may be coded using quad-tree coding wherein the top left 16×16 block is coded, then the top right 16×16 block is coded, then the bottom left 16×16 block is coded, and then the bottom right 16×16 block is coded. Each 16×16 block may be coded using quad-tree coding wherein the top left 8×8 block is coded, then the top right 8×8 block is coded, then the bottom left 8×8 block is coded, and then the bottom right 8×8 block is coded. Each 8×8 block may be coded using quad-tree coding wherein the top left 4×4 block is coded, then the top right 4×4 block is coded, then the bottom left 4×4 block is coded, and then the bottom right 4×4 block is coded. In some implementations, 8×8 blocks may be omitted for a 16×16 block, and the 16×16 block may be coded using quad-tree coding wherein the top left 4×4 block is coded, then the other 4×4 blocks in the 16×16 block are coded in raster-scan order.

Video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

Reducing spectral redundancy may include using a color model based on a luminance component (Y) and two chrominance components (U and V or Cb and Cr), which is referred to as the YUV or YCbCr color model, or color space. Using the YUV color model (instead of the RGB color model or space) includes using a relatively large amount of information to represent the luminance component of a portion of a frame, and using a relatively small amount of information to represent each corresponding chrominance component for the portion of the frame. For example, a portion of a frame is represented by a high resolution luminance component, which may include a 16×16 block of pixels, and by two lower resolution chrominance components, each of which represents the portion of the frame as an 8×8 block of pixels. A pixel indicates a value, for example, a value in the range from 0 to 255, and may be stored or transmitted using, for example, eight bits. Although this disclosure is described in reference to the YUV color model, any color model may be used.

Reducing spatial redundancy may include transforming a block into the frequency domain using a transform, for example, a discrete cosine transform (DCT). A unit of an encoder, such as the transform unit 420 shown in FIG. 4, may perform a DCT using transform coefficient values based on spatial frequency.

Reducing temporal redundancy may include using similarities between frames to encode a frame using a relatively small amount of data based on one or more reference frames.

The reference frames may be previously encoded, decoded, and reconstructed frames of the video stream. For example, a block or pixel of a current frame may be similar to a spatially corresponding block or pixel of a reference frame. A block or pixel of a current frame may be similar to block or pixel of a reference frame at a different spatial location, such that reducing temporal redundancy includes generating motion information indicating the spatial difference, or translation, between the location of the block or pixel in the current frame and a corresponding location of the block or pixel in the reference frame.

Reducing temporal redundancy may also include identifying a block or pixel in a reference frame, or a portion of the reference frame, that corresponds with a current block or pixel of a current frame. For example, a reference frame, or a portion of a reference frame (e.g., stored in memory) is searched for the best block or pixel to use for encoding a current block or pixel of the current frame. The search may identify the block of the reference frame for which the difference in pixel values between the reference block and the current block is minimized in a process referred to as motion searching. In some implementations, the portion of the reference frame searched is limited in motion searching. For example, the portion of the reference frame searched (e.g., the search area) may include a limited number of rows of the reference frame. In an example, identifying the reference block includes calculating a cost function, such as a sum of absolute differences (SAD), between the pixels of the blocks in the search area and the pixels of the current block.

The spatial difference between the location of the reference block in the reference frame and the current block in the current frame may be represented as a motion vector. The difference in pixel values between the reference block and the current block is referred to as differential data, residual data, or as a residual block. Generating motion vectors is referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix as shown, or in a one dimensional data structure, such as a vector array. A representation of the frame, such as a two dimensional representation as shown, may correspond to a physical location in a rendering of the frame as an image. For example, a location in the top left corner of a block in the top left corner of the frame corresponds with a physical location in the top left corner of a rendering of the frame as an image.

Video coding for a current block may include identifying an optimal coding mode from multiple candidate coding modes, which provides flexibility in handling video signals with various statistical properties, and may improve the compression efficiency. For example, a video coder evaluates several candidate coding modes to identify the optimal coding mode for a block, which may be the coding mode that minimizes an error metric, such as an RD cost, for the current block. In some implementations, the complexity of searching the candidate coding modes is reduced by limiting the set of available candidate coding modes based on similarities between the current block and a corresponding prediction block.

Block based coding efficiency is improved by partitioning blocks into one or more partitions, which may be rectangular, including square, partitions. In some implementations, video coding using partitioning includes selecting a partitioning scheme from among multiple candidate partitioning schemes. For example, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using partitioning includes a full partition search, which includes selecting a partitioning scheme by encoding the coding unit using each available candidate partitioning scheme and selecting the best scheme, such as the scheme that produces the least rate-distortion error or cost.

Encoding a video frame as described herein includes identifying a partitioning scheme for encoding a current block as considered in the scan order. Identifying a partitioning scheme may include determining whether to encode the block as a single partition of maximum coding unit size, which is 64×64 as shown, or to partition the block into multiple partitions, which correspond with the sub-blocks, such as the 32×32 blocks 620, the 16×16 blocks 630, or the 8×8 blocks 640, as shown, and may include determining whether to partition the sub-blocks into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

Figure 7:
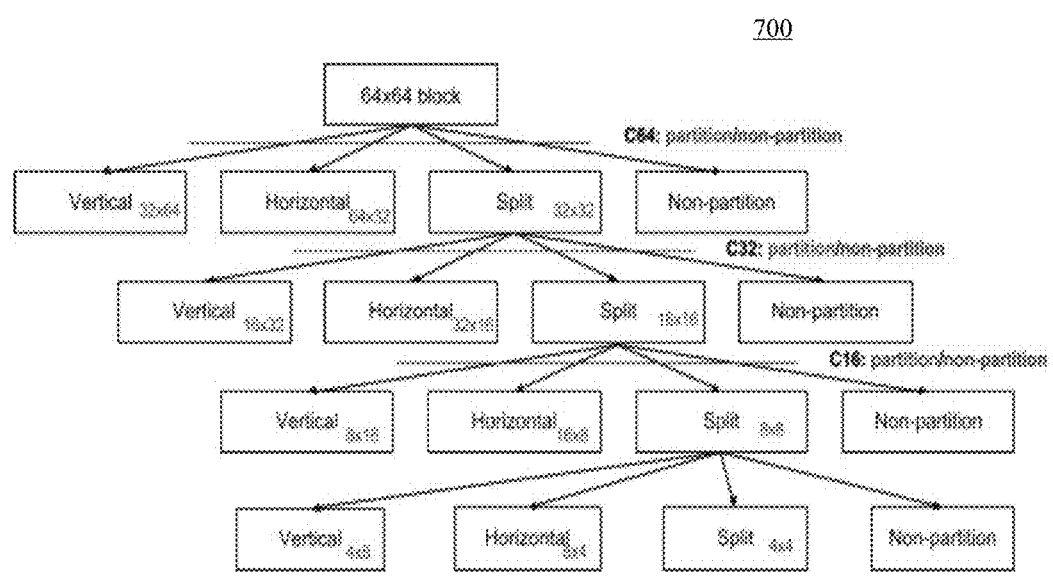
FIG. 7 is a diagram of a decision tree for recursive partitioning illustrating binary classifiers for three block size levels.

A partition search according to the teachings herein is described in additional detail starting with FIG. 7. FIG. 7 is a diagram of a decision tree 700 for recursive partitioning illustrating binary classifiers for three block size levels. More specifically, and as mentioned briefly above, a multi-level machine learning-based termination scheme uses a classifier to determine, for a given partition node, whether to continue the search down to its child nodes, or perform the early termination and take the current block size as the final one for the particular branch.

With reference to the example of FIG. 7, every block size level down to the minimum block size (here 4×4) involves a decision of whether to perform a vertical partition, a horizontal partition, a split partition, or no partition. The decision, at a particular block size level, as to which partition is best may be based on error values such as a RD cost calculation. That is, the rate (e.g., the number of bits to encode the partition) and the distortion (e.g., the error in the reconstructed frame versus the original frame) are calculated. The lowest rate compared to the level of distortion (e.g., the lowest RD cost) indicates the best partitioning for the block size level. If there is no partition at a block size level, further partitioning to child nodes is not considered. Also, if the vertical or horizontal partition is selected, further partitioning to child nodes is not considered. If the split partition is selected, further partitioning to child nodes is possible.

As an example, when the largest coding unit is a 64×64 block, no partition results in a final block size of 64×64 pixels. When the partition for the 64×64 block, further partitioning of the 64×64 block is possible. For example, the vertical partition of a 64×64 block comprises two partitions (and final block sizes of 32×64 pixels), the horizontal partition of a 64×64 block comprises two partitions (and final block sizes of 64×32 pixels), and the split partition of a 64×64 block comprises four partitions of 32×32 each. When encoding a 32×32 block, no partition of a 32×32 block results in a final block size of 32×32 pixels. When the partition for a 32×32 block is the split partition, further partitioning of the 32×32 block is possible. For example, the vertical partition of a 32×32 block comprises two partitions (and final block sizes of 16×32 pixels), the horizontal partition of a 32×32 block comprises two partitions (and final block sizes of 32×16 pixels), and the split partition of a 32×32 block comprises four partitions of 16×16 each. Similarly, no partition of a 16×16 block results in a final block size of 16×16 pixels. When the partition for a 16×16 block is the split partition, further partitioning of the 16×16 block is possible. For example, the vertical partition of a 16×16 block comprises two partitions (and final block sizes of 8×16 pixels), the horizontal partition of a 16×16 block comprises two partitions (and final block sizes of 16×8 pixels), and the split partition of a 16×16 block comprises four partitions of 8×8 each. No partition of an 8×8 block results in a final block size of 8×8 pixels. When the partition for an 8×8 block is the split partition, further partitioning of the 8×8 block is possible. For example, the vertical partition of an 8×8 block comprises two partitions (and final block sizes of 4×8 pixels), the horizontal partition of an 8×8 block comprises two partitions (and final block sizes of 8×4 pixels), and the split partition of an 8×8 block comprises four partitions of 4×4 each. The smallest partition size is 4×4 pixels in this example.

The early termination decision according to the teachings herein may be made at some or all block size levels. One classifier may be trained for each block size level. In the example shown in FIG. 7, early termination is implemented for block sizes 64×64, 32×32, and 16×16, and three classifiers denoted as C64, C32, and C16 are trained. That is, when a block having a block size of 64×64 pixels, 32×32 pixels, or 16×16 pixels is under consideration, an early termination decision may be made as to whether to partition the block or to not partition the block (also referred to as a partition/non-partition decision) using the classifier for the block size. When the decision is made, the vertical partition mode, horizontal partition mode, and split partition mode may be compared to no partition. Although three early termination decisions are shown by example, the number of termination decisions may be made for more or fewer block size levels (including, in some examples, every level where partitioning is possible).

Figure 8:
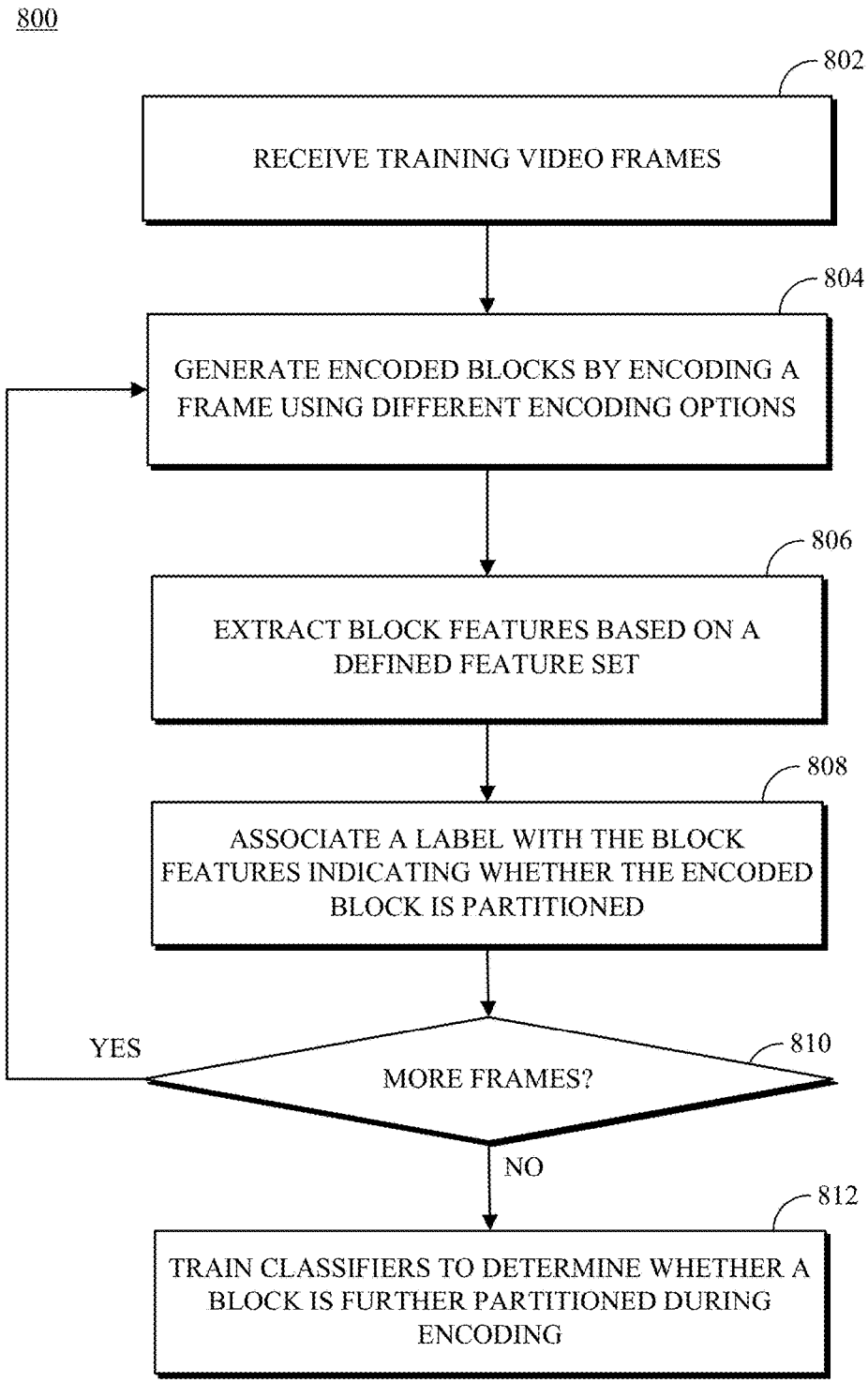
FIG. 8 is a flow chart diagram of a process for training classifiers in accordance with implementations of this disclosure.

FIG. 8 is a flow chart diagram of a process 800 for training classifiers in accordance with implementations of this disclosure. The process 800 may be implemented by a processor, such as the processor 140 of FIG. 1, in conjunction with an encoder, such as the encoder 400 of FIG. 4. The process 800 may be implemented by instructions, such as the instructions 160 of FIG. 1.

Training classifiers first involves preparing training data. Preparing the training data is described with regard to 802-810 of FIG. 8. At 802, training frames are received. The training frames may be received by accessing stored video frames stored in a memory, such as the memory 150. The training frames may be received from an external source through the communication unit 120. Any way of reading, obtaining, or otherwise receiving the training frames is possible. The training frames may be selected from one or more training video sequences. In one example, twenty frames from four training videos are used as the training frames. The training frames may have images with different characteristics. For example, the training frames could have background content with little change in color within the frame, foreground objects with edges, screen casting content, etc. Different characteristics allow the training frames, when encoded, to provide a variety of training data for different block sizes. In this example, the different block sizes are N×N, where N=64, 32, and 16, but other block sizes may be used.

The frames are next encoded multiple times with different encoding options (also called parameters herein) to generate encoded blocks starting at 804. Generating the encoded blocks at 804 can include selecting a first frame of the training frames. There is no particular sequence required for consideration of the frames, and the term first frame, and other references to frames, are used merely to distinguish the frames from each other. Generating the encoded blocks at 804 can also include selecting a set of encoding options for each instance of encoding the frame. The set of encoding options may include, for each instance of encoding the frame, quantization parameter, resolution, etc. Some or all of the values for the encoding options can change for each frame. For example, the resolution can remain the same in at least two sets of encoding options, while the quantization parameter changes for each set. In another example, the quantization parameter is the same in at least two sets of encoding options. Various sets of encoding options are possible, where desirably at least one value of an encoding option and/or at least one encoding option is different in each set of encoding options.

The set of encoding options may be obtained by establishing different target bitrates for respectively encoding each training frame. Bitrate is a measurement of the number of bits transmitted over a set length of time. Different target bitrates involve different encoding options and/or different values for the encoding options. The use of different target bitrates for a training frame thus results in training data that considers different encoding options or parameters for the same input content (e.g., the input frame). In an example, 10-14 different target bitrates may be used for each frame.

Using each of the sets of encoding options, the first frame is encoded using partitioning at 804 as discussed by example with respect to FIG. 6. Stated broadly, blocks are considered in a scan order. The blocks are not partitioned—that is, they are first considered at the largest coding unit size. The blocks may be, for example, 64×64 blocks, such as the 64×64 blocks 610 shown in FIG. 6. Each block may be encoded using different available prediction modes, such as one or more inter prediction modes, one or more intra prediction modes, or a combination of different inter and intra prediction modes. In some implementations, all available prediction modes are used to encode the blocks.

Each block may be recursively partitioned into different partition modes. For example, a block may be partitioned according to the decision tree (also called a partition tree) 700 of FIG. 7 using a horizontal partition mode, a vertical partition mode, or a split partition mode. At each node of the partition tree 700, the sub-blocks (also called the partitioned blocks or blocks) are encoded using different available prediction modes. It is possible that, at each node of the partition tree 700, the sub-blocks are encoded using all available prediction modes. The sub-blocks may be encoded using all different combinations of the available prediction modes. For each encoded block and combination of sub-blocks of the block (e.g., at each node), an error value such as the RD cost is calculated. The partition mode (including no partition mode) and prediction mode(s) for each block are selected based on the lowest error value.

Although each available prediction mode can be considered, techniques that reduce the number of prediction modes tested may be used with the teachings herein.

Figure 10A:
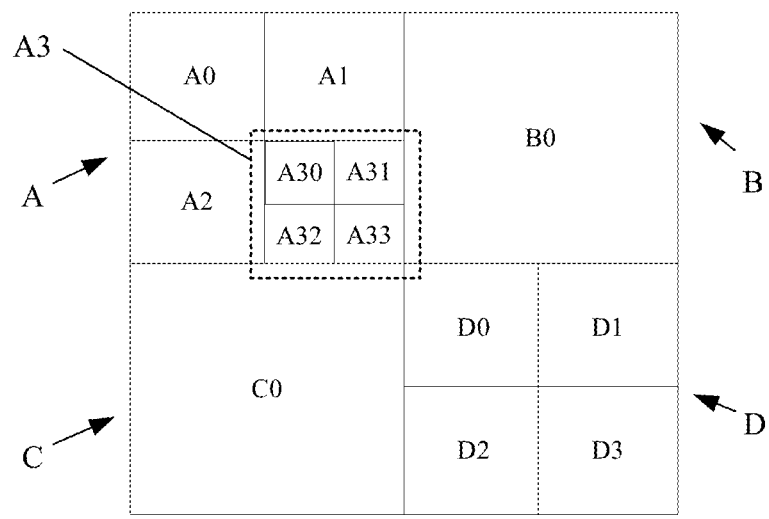
FIG. 10A is a diagram of a portion of a frame partitioned in accordance with a first set of encoding options.

The process of generating encoded blocks at 804 for a first set of encoding options can be seen by reference to the example of FIG. 10A, which is a diagram of a portion of a frame partitioned in accordance with a first set of encoding options. Assuming that the portion is a N×N block, where N=64, processed in raster scan order, the block as a whole is first considered. After considering various prediction modes for the portion without partitioning, other prediction and partition modes are considered. Assuming the decision tree 700 of FIG. 7 applies, the vertical, horizontal, and split partition modes are next considered with various prediction modes. For each of the four $$\frac{N}{2} \times \frac{N}{2}$$

blocks (sub-blocks A-D) of the split partition mode, the vertical, horizontal, and split partition modes are considered with various prediction modes. For the sub-block A, for example, the split partition mode results in the four $$\frac{N}{4} \times \frac{N}{4}$$

blocks (sub-blocks A0-A3). For each of sub-blocks A0-A3 of the split partition mode, the vertical, horizontal, and split partition modes are considered with various prediction modes. This process for block A continues until the smallest prediction block size is reached. In this example where the training instances for training binary classifiers C64, C32, and C16 for three block size levels (i.e., 64×64 pixels, 32×32 pixels, and 16×16 pixels) are generated, the optimal way to encode each block is recorded and later serves as the associated label for the training instances.

The same processing is performed for each of sub-blocks B, C, and D. That is, the sub-blocks are recursively partitioned (also called recursively decomposed). At each node, different prediction modes are evaluated, and a best prediction mode is selected. From this information, the error value at each node is determined.

Using the first set of encoding options, the best partitioning for the portion is shown. For the portion in FIG. 10A, the error value for encoding the N×N block portion with no partitioning is higher than the sum of the error values for encoding the four $$\frac{N}{2} \times \frac{N}{2}$$

blocks (sub-blocks A-D), which is in turn lower than the sum of the error values for encoding the two vertical $$\frac{N}{2} \times N$$

blocks of a vertical partition mode for the portion and the sum of the error values for encoding the two horizontal $$N \times \frac{N}{2}$$

blocks of a horizontal partition mode for the portion. The error value for encoding the sub-block A with no partitioning is higher than the sum of the error values for encoding the four $$\frac{N}{4} \times \frac{N}{4}$$

blocks (sub-blocks A0-A3), which is in turn lower than encoding the two vertical $$\frac{N}{4} \times \frac{N}{2}$$

blocks of a vertical partition mode for the sub-block A and the sum of the error values for encoding the two horizontal $$\frac{N}{2} \times \frac{N}{4}$$

blocks of a horizontal partition mode for the sub-block A. The error value for encoding each the three $$\frac{N}{4} \times \frac{N}{4}$$

blocks labeled sub-blocks A0, A1, and A2 with no partitioning is lower than the sum of the error values for each of the partition modes—the vertical partition mode (two $$\frac{N}{8} \times \frac{N}{4}$$

blocks), the horizontal partition mode (two $$\frac{N}{4} \times \frac{N}{8}$$

blocks), and the split partition mode (four $$\frac{N}{8} \times \frac{N}{8}$$

blocks). In contrast, the error value for encoding the $$\frac{N}{4} \times \frac{N}{4}$$

block labeled sub-block A3 with no partitioning is higher than the sum of the error values for encoding the four $$\frac{N}{8} \times \frac{N}{8}$$

blocks (sub-blocks A30-A33), which is in turn lower than encoding the two vertical $$\frac{N}{8} \times \frac{N}{4}$$

blocks of a vertical partition mode for the sub-block A3 and the sum of the error values for encoding the two horizontal $$\frac{N}{4} \times \frac{N}{8}$$

blocks of a horizontal partition mode for the sub-block A3. With regard to the two $$\frac{N}{2} \times \frac{N}{2}$$

blocks labeled sub-blocks B and C, the error value for encoding each with no partitioning (sub-blocks B0 and C0) is lower than the sum of the error values for each of the partition modes—the vertical partition mode (two $$\frac{N}{4} \times \frac{N}{2}$$

blocks), the horizontal partition mode (two a $$\frac{N}{2} \times \frac{N}{4}$$

blocks), and the split partition mode (four $$\frac{N}{4} \times \frac{N}{4}$$

blocks), and for each partition mode of the split mode according to the decision tree 700. In some implementations, when a node is reached where one of the partition modes does not result in a lower error value, further partitioning is not performed. Thus, once it is determined that no partitioning for sub-blocks B and C has a lower error value than any of the vertical, horizontal, or split partition modes, partitioning the blocks resulting from the split partition mode may be omitted.

The error value for encoding the $$\frac{N}{2} \times \frac{N}{2}$$

block labeled sub-block D with no partitioning is higher than the sum of the error values for encoding the four $$\frac{N}{4} \times \frac{N}{4}$$

blocks resulting from the split partition mode (sub-blocks D0-D3), which is in turn lower than the sum of the error values for encoding the two vertical $$\frac{N}{4} \times \frac{N}{2}$$

blocks of a vertical partition mode for the sub-block D and the sum of the error values for encoding the two horizontal $$\frac{N}{2} \times \frac{N}{4}$$

blocks of a horizontal partition mode for the sub-block D. Further partitioning of the four $$\frac{N}{4} \times \frac{N}{4}$$

blocks labeled sub-blocks D0-D3 does not result in a reduction of the error values in this example, so sub-blocks D0-D3 represent the best or optimal partitioning of sub-block D.

Figure 10B:
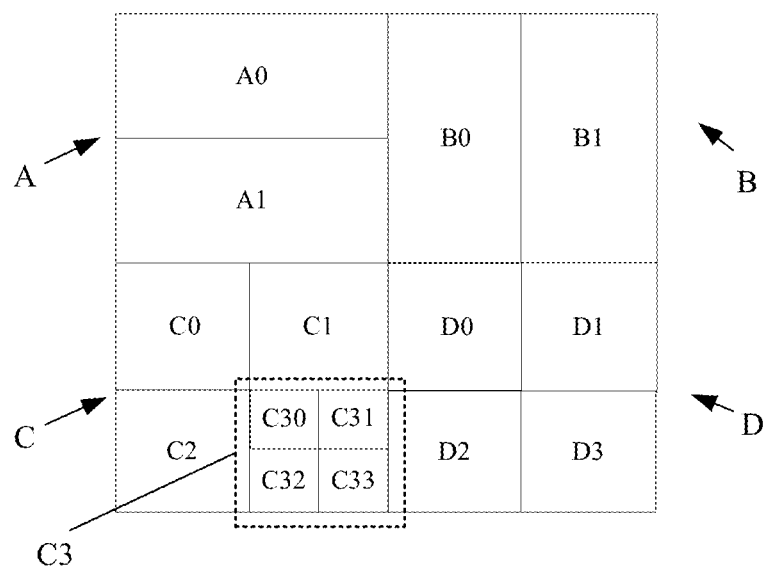
FIG. 10B is a diagram of a portion of a frame partitioned in accordance with a second set of encoding options.

The partitioning of FIG. 10A is obtained using a first set of encoding options. FIG. 10B is a diagram of a portion of a frame partitioned using a second set of encoding parameters. The portion of FIG. 10B is the same as that in FIG. 10A in this example, but the partitioning is different due to the use of a different set of encoding options. The same processing described with regard to FIG. 10A is performed. That is, the portion is recursively partitioned (also called recursively decomposed) according to the decision tree 700 using different prediction modes. At each node, the error value is determined. The lowest error value determines the partitioning at the node.

With regard to FIG. 10B, the best partitioning for the portion using the second set of encoding options is shown by example. The error value for encoding the portion with no partitioning (i.e., the entire N×N block) is higher than the sum of the error values for encoding the four $$\frac{N}{2} \times \frac{N}{2}$$

blocks resulting from a split partition mode for the portion (labeled sub-blocks A-D), which is in turn lower than the sum of the error values for encoding the two vertical $\frac{N}{2} \times N$ blocks of a vertical partition mode for the portion and the sum of the error values for encoding the two horizontal $N \times \frac{N}{2}$ blocks of a horizontal partition mode for the portion.

With regard to partitioning the $\frac{N}{2} \times \frac{N}{2}$ block labeled sub-block A, the error value for encoding the sub-block A with no partitioning is higher than the sum of the error values for encoding the two $\frac{N}{2} \times \frac{N}{4}$ blocks (sub-blocks A0 and A1) resulting from the horizontal partition mode, which is in turn lower than encoding the two vertical $\frac{N}{4} \times \frac{N}{2}$ blocks of a vertical partition mode for the sub-block A and the sum of the error values for encoding the four $\frac{N}{4} \times \frac{N}{4}$ blocks of a split partition mode for the sub-block A. Because the horizontal partition mode has no further partition modes in the example of FIG. 7, further processing of sub-blocks A0 and A1 is omitted. That is, further partitioning at each node is not performed. Similarly, the error value for encoding the $\frac{N}{2} \times \frac{N}{2}$ block labeled sub-block B with no partitioning is higher than the sum of the error values for encoding the two $\frac{N}{4} \times \frac{N}{2}$ blocks (sub-blocks B0 and B1) resulting from the vertical partition mode, which is in turn lower than encoding the two horizontal $\frac{N}{2} \times \frac{N}{4}$ blocks of a horizontal partition mode for the sub-block B and the sum of the error values for encoding the four $\frac{N}{4} \times \frac{N}{4}$ blocks of a split partition mode for the sub-block B. Because the vertical partition mode has no further partition modes in the example of FIG. 7, further processing of sub-blocks B0 and B11 is omitted.

The $\frac{N}{2} \times \frac{N}{2}$ block labeled sub-block C of FIG. 10B is partitioned into more blocks. The error value for encoding the sub-block C with no partitioning is higher than the sum of the error values for encoding the four $\frac{N}{4} \times \frac{N}{4}$ blocks (sub-blocks C0-C3) resulting from a split partition mode, which is in turn lower than encoding the two vertical $\frac{N}{4} \times \frac{N}{2}$ blocks of a vertical partition mode for the sub-block C and the sum of the error values for encoding the two horizontal $\frac{N}{2} \times \frac{N}{4}$ blocks of a horizontal partition mode for the sub-block C. The error value for encoding each of three of the four $\frac{N}{4} \times \frac{N}{4}$ blocks (namely, sub-blocks C0, C1, and C2) with no partitioning is lower than the sum of the error values for each of the partition modes—the vertical partition mode (two $\frac{N}{8} \times \frac{N}{4}$ blocks), the horizontal partition mode (two $$\frac{N}{4} \times \frac{N}{8}$$

blocks), and the split partition mode (four $$\frac{N}{8} \times \frac{N}{8}$$

blocks). In contrast, the error value for encoding the final $$\frac{N}{4} \times \frac{N}{4}$$

block (sub-block C3) with no partitioning is higher than the sum of the error values for encoding the four $$\frac{N}{8} \times \frac{N}{8}$$

blocks (sub-blocks C30-C33) resulting from a split partition mode, which is in turn lower than encoding the two vertical $$\frac{N}{8} \times \frac{N}{4}$$

blocks of a vertical partition mode for the sub-block C3 and the sum of the error values for encoding the two horizontal $$\frac{N}{4} \times \frac{N}{8}$$

blocks of a horizontal partition mode for the sub-block C3.

Finally, and as also true of the sub-block D in FIG. 10A, the error value for encoding the $$\frac{N}{2} \times \frac{N}{2}$$

block labeled sub-block D in FIG. 10B with no partitioning is higher than the sum of the error values for encoding the four $$\frac{N}{4} \times \frac{N}{4}$$

blocks (sub-blocks D0-D3) resulting from a split partition mode, which is in turn lower than the sum of the error values for encoding two vertical $$\frac{N}{4} \times \frac{N}{2}$$

blocks of a vertical partition mode for the sub-block D and the sum of the error values for encoding two horizontal $$\frac{N}{2} \times \frac{N}{4}$$

blocks of a horizontal partition mode for the sub-block D. Further partitioning of any of the four $$\frac{N}{4} \times \frac{N}{4}$$

blocks labeled sub-blocks D0-D3 does not result in a reduction of the error values in this example, so sub-blocks D0-D3 represent the best or optimal partitioning of sub-block D.

FIGS. 10A and 10B illustrate encoding a portion of the same frame using two different sets of encoding options. The remainder of the frame is similarly partitioned and encoded to generate encoded blocks at 804. After generating the encoded blocks by encoding the frame using different encoding options at 804, the process 800 extracts features from the training data and labels each instance. In the example of FIG. 8, extracting features from the training data includes extracting block features based on a defined feature set at 806. As also shown in FIG. 8, labeling each instance may include associating the label with the block features at 808. The processing at 806 and 808 is described with reference to the example of FIG. 11.

FIG. 11 is a diagram of feature extraction using the portion of the frame of FIGS. 10A and 10B as partitioned. The extracted data is shown in a single table in this example, but this is not necessary. More than one table may be used. The extracted data may be stored in various forms. The extracted data may be stored in one or more different files. The extracted data may be stored by block size, for example. In FIG. 11, each training instance 1-13 is associated with a block of FIG. 10A for which a partition decision was made, and each training instance 14-26 is associated with a block of FIG. 10B for which a partition decision was made. For each block, features 1 through N are extracted as respective values for the block corresponding to the features.

In an example where the training data is obtained from a high-definition (HD) video stream, for example, the block features used for training, and hence those extracted at 806, can include six or more features. In one example, the block features include: 1) the rate cost of the non-partition mode for the current block; 2) the distortion cost of the non-partition mode for the current block; 3) a magnitude of the motion vector of the non-partition mode for the current block (if any); 4) partition mode(s) of some or all of the co-located block in the last frame, the above block in the current frame, and the left block in the current frame; 5) a number of nonzero coefficients to encode the non-partition mode for the current block; and 6) a quantizer (Q) value or quantization level of the current block or frame. Any informative block feature may be used. The block features used may be limited to those available to the encoder at the time of partitioning a current block in raster scan order. For example, block features may exclude those that are only known while partitioning or after partitioning at a particular block node is complete.

When lower resolution video streams are used, the number of features forming the defined feature set may be reduced. Alternatively, or additionally, features with a fewer number of values or choices may be used. Either one or both of these options results in smaller feature dimensions for the training data set. This reduces the computational overhead in both the training and the use of the linear classifiers during online testing for early termination.

Each training instance is labeled at 808. For example, a label is associated with the block features indicating whether the encoded block is partitioned. The label of each training instance is determined by the optimal partition decision of the current block node. In the example of FIG. 11, the label "1" indicates that the current block node is the final best choice, i.e., the node is not further partitioned. The label "0" indicates that further search is needed, i.e., the node is further partitioned. Because the teachings herein describe a binary classifier, the particular further partition mode used (e.g., a horizontal partition mode, a vertical partition mode, or a split partition mode) is not specified by these labels. In other words, the binary classifier specifies whether a block is to be further partitioned, or not partitioned, but does not specify the partition mode used for the further partitioning. A multi-label classifier can be trained to further differentiate the partition modes (e.g., a horizontal partition mode, a vertical partition mode, or a split partition mode) to further speed-up the encoding process.

Once the block features are extracted at 806 and the label is associated at 808, the process 800 performs a query at 810 as to whether there are more frames in the set of training video frames. If so, the process 800 returns to 804 to generate encoded blocks by encoding the new frame using different encoding options in a similar manner as described with regard to FIGS. 10A and 10B. If instead there are no further frames at 810, the process 800 advances to 812 to train the classifiers to determine whether a block need be further partitioned during encoding.

As mentioned previously, the classifiers are generated for different block sizes, in this example $$N \times N, \frac{N}{2} \times \frac{N}{2}, \text{ and } \frac{N}{4} \times \frac{N}{4}.$$

In some cases, the block sizes can include $$\frac{N}{8} \times \frac{N}{8}$$

such that four classifiers are generated. The value N can be equal to 64. If the value N is greater than 64, additional classifiers may be generated.

The block features extracted for each training instance have respective values. In some implementations, absolute values are used. Training the classifiers at 812 can include training the classifiers using the training instances. However, the absolute value for each feature dimension can vary dramatically. Before training the classifiers, a dimensional-wised normalization may be performed on the features before training. While many different normalization schemes or techniques are possible, this disclosure describes a standardization method (also called a standardization normalization scheme or technique herein) for each feature vector or value x in dimension i where:

$$x_i' = (x_i - \overline{x_i}) / \sigma_i \quad (1)$$

In equation (1), $x_i$ is the original feature vector, and $x_i'$ is the normalized feature vector. Stated another way, $x_i$ is the original value for the feature at dimension i, and $x_i'$ is the normalized value for the feature at dimension i. Equation (1) also uses the mean $\overline{x_i}$ and the standard deviation $\sigma_i$ in that feature dimension i. The normalized values may be arranged in a table similar to that in FIG. 11, or may be stored in another format with similar data. For example, the normalized values for feature 1 through feature K may replace the original values for feature 1 through feature K (e.g., $V_{11}$ through $V_{26K}$) in FIG. 11.

Compared to other techniques, using the standardization method for normalization is simple and effective. For example, using softmax with a sigmoid function involves one exponential operation, two division operations, and several addition/subtraction operations to normalize a feature dimension in each training instance. In contrast, the standardization method uses one subtraction operation and one division operation (can easily be modify to 1 multiplication) for normalization. Normalization can also be used in the encoding phase for each evaluated block node, so a computationally simple technique involving low overhead compared with other normalization techniques is desirable. One or more variance values may be used in addition to, or instead of, the standard deviation.

After normalization, training the classifiers to determine whether a block is to be further partitioned during encoding at 812 can include training an individual linear binary classifier for each block size. Both the normalization and the training at 812 may be performed on a block-size basis. For example, in the normalization process, the mean $\overline{x_i}$ and the standard deviation $\sigma_i$ may be calculated per block size in addition to per feature dimension i. In the example of FIG. 7, there are three classifiers C64, C32, and C16 respectively associated with a N×N block, a $$\frac{N}{2} \times \frac{N}{2}$$

block, and a $$\frac{N}{4} \times \frac{N}{4}$$

lock.

In the example of encoding a frame using sets of encoding options summarized in FIG. 11, training instances 1 and 14 are associated with the partitioning of a N×N block. In general, more examples are used for training that the examples provided herein. The value $V_{11}$ for feature dimension 1 in training instance 1 and the value $V_{141}$ for feature dimension 1 in training instance 14 may be used in the calculation of the mean $\overline{x_1}$ and the standard deviation $\sigma_1$ for feature dimension 1. Similarly, the respective values for the remaining features in training instances 1 and 14 through feature dimension K may be used in the calculation of the mean and standard deviation for each feature (e.g., the value $V_{1K}$ in training instance 1 and the value $V_{14K}$ in training instance 14 may be used in the calculation of the mean $\overline{x_K}$ and the standard deviation $\sigma_K$ for feature dimension K). The classifier C64 is trained at 812 using this (e.g., normalized) data as input into a machine-learning process. There is no particular machine-learning process required to train the classifier C64. In general, a machine-learning process that uses supervised learning is desirable because example inputs (i.e., values for each features), together with their desired outputs (i.e., whether to partition or not partition) are available to generate a general rule that maps the inputs to the outputs. A convolutional neural network (CNN) and a support vector machine (SVM) are examples of a machine-learning process that can be used in the training at 812.

Also in FIG. 11, the training instances 2-5 and 15-18 are associated with the partitioning of respective $$\frac{N}{2} \times \frac{N}{2}$$

(i.e., 32×32) blocks. The values $V_{21}$-$V_{51}$ and $V_{151}$-$V_{181}$ for feature dimension 1 in training instances 2-5 and 15-18 may be used in the calculation of the mean $\overline{x_1}$ and the standard deviation $\sigma_1$ for feature dimension 1 at this block size level. Similarly, the respective values for the remaining features in training instances 2-5 and 15-18 through feature dimension K may be used in the calculation of the mean and standard deviation for each feature dimension (e.g., the values $V_{2K}$-$V_{5K}$ and $V_{15K}$-$V_{18K}$ may be used in the calculation of the mean $\overline{x_K}$ and the standard deviation $\sigma_K$ for feature dimension K). The classifier C32 is trained at 812 using this (e.g., normalized) data as input into a machine-learning process. The machine-learning process used to train the classifier C32 can be the same or different from the machine-learning process used to train the classifier C64.

Finally, the training instances 6-13 and 19-26 are associated with the partitioning of a $$\frac{N}{4} \times \frac{N}{4}$$

(i.e., a 16×16) block. The values $V_{61}$-$V_{131}$ and $V_{191}$-$V_{261}$ for feature 1 in training instances 6-13 and 19-26 may be used in the calculation of the mean $\overline{x_1}$ and the standard deviation $\sigma_1$ for feature dimension 1 at this block level size. Similarly, the respective values for the remaining features in training instances 6-13 and 19-26 through feature dimension K may be used in the calculation of the mean and standard deviation for each feature (e.g., the values $V_{6K}$-$V_{13K}$ and $V_{19K}$-$V_{26K}$ may be used in the calculation of the mean $\overline{x_K}$ and the standard deviation $\sigma_K$ for feature dimension K). The classifier C16 is trained at 812 using this (e.g., normalized) data as input into a machine-learning process. The machine-learning process used to train the classifier C16 can be the same or different from the machine-learning process used to train the classifier C32 and the classifier C64.

For binary classification, weights assigned to each training instance during training may be the same. However, in the context of video encoding, misclassifying positive samples (in this case non-partition blocks) as negative samples (partition blocks) does not cause any RD cost increase. That is, this misclassification does not cause any increase in error value (no quality loss). In contrast, misclassifying negative samples (in this case partition blocks) as positive samples (non-partition blocks) can increase the error value, e.g., the RD cost. Based on this fact, an additional validation dataset to control the maximum increase in error value allowed may be used to modify the trained classifiers at 812.

Figure 9:
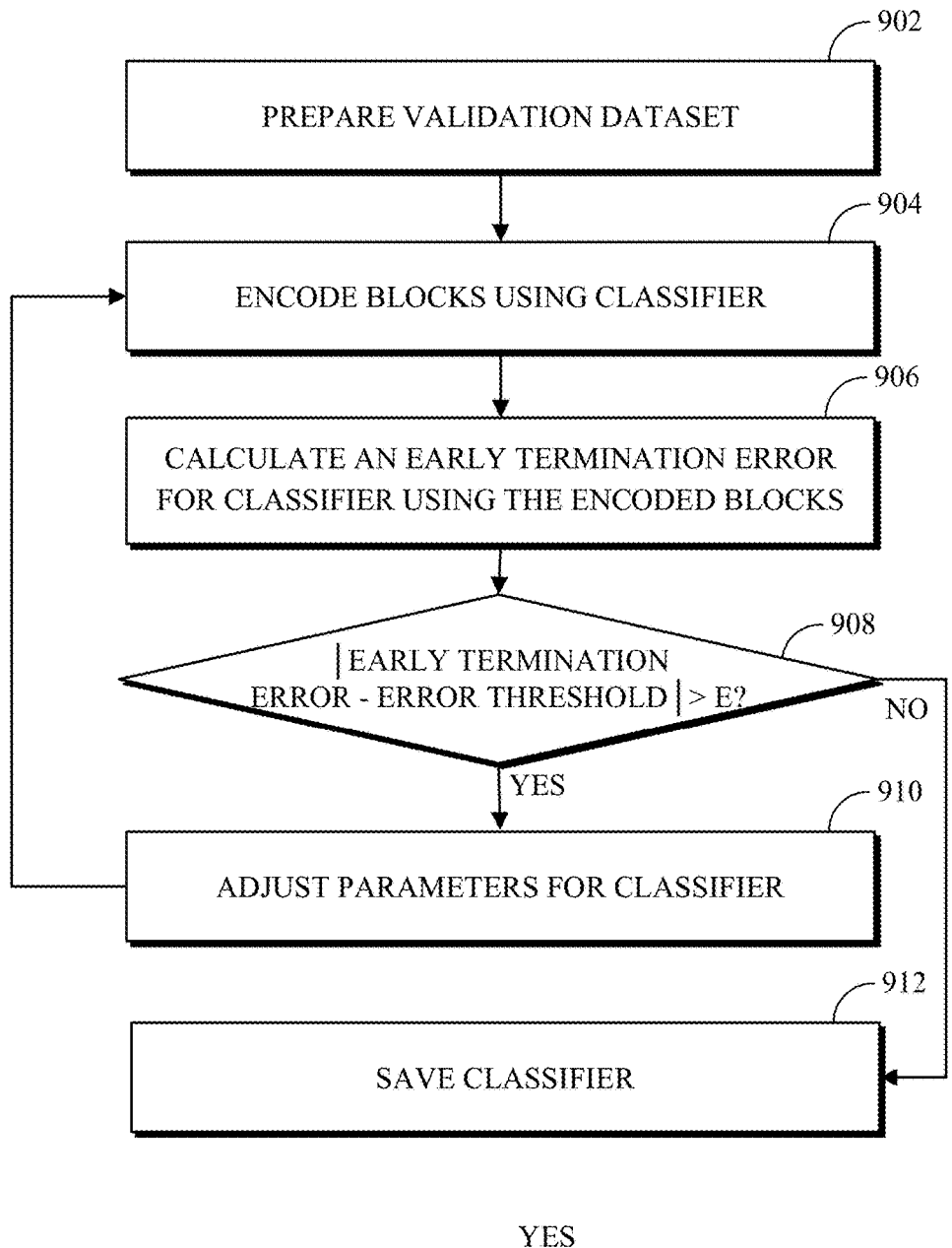
FIG. 9 is a flow chart diagram of a process for modifying and finalizing a classifier with additional validation data in accordance with implementations of this disclosure.

FIG. 9 is a flow chart diagram of a process 900 for modifying and finalizing a classifier with additional validation data in accordance with implementations of this disclosure. The process 900 may be implemented by a processor, such as the processor 140 of FIG. 1, in conjunction with an encoder, such as the encoder 400 of FIG. 4. The process 900 may be implemented by instructions, such as the instructions 160 of FIG. 1. The process 900 may also be referred to a validating a classifier.

At 902, the validation dataset is prepared. The validation dataset may be prepared using a number of validation video frames. The validation frames may be received in a similar manner as described with regard to receiving the training frames at 802. In an example, 80 frames from four video sequences may be used for preparation of the validation dataset at 902. Preparation of the validation dataset may occur in the same manner as the training set. That is, the validation dataset may be prepared by, for each validation frame, generating encoded blocks by encoding the frame as described at 804, extracting block features based on a defined feature set as described at 806, and associating a label with the block features indicating whether the encoded block is partitioned as described at 808. Normalization as described at 812 may be thereafter performed.

The validation dataset, which is prepared without early termination, is used to determine the increase in an error value resulting from early termination decided by the previously-trained classifiers. Starting at 904, the blocks used to prepare the validation dataset are encoded using pre-trained classifiers. The pre-trained classifiers are the classifiers generated at 812. Each block of a frame may be considered sequentially (i.e., in the scan order) and, according to the block size, the corresponding classifier is used to decide whether or not to terminate the partition search process. Each block may be considered in the scan order for partitioning but be grouped in accordance with the decision tree used for partitioning, e.g., from largest to smallest prediction block size, for validating (and adjusting, if applicable) the single classifier applicable for the respective block size. The process 900 shown in FIG. 9 describes an example where a trained classifier is adjusted based on the average encoding cost increase in the validation dataset due to the early termination caused by that classifier as explained in more detail below.

Encoding the block using the classifiers at 904 can include extracting the values for features for the blocks as inputs for the classifier at the current node. These values may also referred to herein as extracted features for easier reference. The features for the block may include those used to train the classifier. The extracted features may be normalized after extraction. The normalization technique may be the same as that discussed at 812.

At 904, features extracted for the N×N blocks are used as inputs to the N×N classifier, here C64. The output of the classifier for each N×N block is a binary value, i.e., 0 or 1. The value 0 indicates to partition a current N×N block, while the value 1 indicates to not partition the block. If the value 1 is output, no further partitioning of the current N×N block occurs. If the value 0 is output, the vertical partition mode, horizontal partition mode, and split partition mode are tested with different prediction modes. The partitioning resulting in the lowest error value is used to select the partition mode for the current N×N block.

At 906, an early termination error for the classifier is calculated using the encoded blocks. The early termination error represents an increase in error (also referred to as a reduction in coding efficiency) resulting from terminating the partitioning early versus encoding without early termination (e.g., the optimal encoding with minimal RD cost as an example). The early termination error may be calculated for all encoded blocks of the same size, which are then averaged or otherwise combined to obtain a single value to represent the early termination error. The calculation may be limited to using blocks that terminate early by comparing the partition decision for the blocks having the current size to the partition decision for those blocks made while preparing the validation dataset at 902. The blocks of the current size that, in the validation dataset, are not terminated are used.

In an example of this latter processing, the early termination error is calculated as the ratio of the RD cost increase caused by early termination to the best RD cost while encoding without early termination. The RD cost increase is the amount by which the best prediction for the non-partitioned block, terminated by the trained classifier, exceeds the best RD cost while encoding without early termination known from the validation dataset prepared at 902. To normalize this value for comparison purposes, the early termination error for each of the blocks of the current size so terminated can be averaged, with the average being divided by the total error of the blocks early terminated as obtained from the validation dataset prepared at 902. The resulting value represents the early termination error for the classifier. Other ways of calculating an early termination error are possible.

At 908, the early termination error is compared to a (e.g., pre-set) error threshold. The error threshold may also be considered a maximum allowed increase in the error value resulting from early termination of partitioning blocks in validation frame(s) of the validation dataset. In one example, the error threshold for the classifier C64 is 0.1%, but other values are possible. The error threshold may be higher where there is a larger tolerance for image degradation, or where bandwidth is of little concern. If the early termination error is above the error threshold at 908, the process 900 advances to 910 to adjust parameters for the current classifier by retraining the classifier using the training instances. The classifier parameters are adjusted to maximize the blocks terminated early while keeping the early termination error under the error threshold. This can be achieved in several ways. One way in which this can be achieved is to modify the weighting applied to one or more features within the classifier. For example, misclassifying non-partition blocks (positive samples) as partition blocks (negative samples) does not result in a RD cost increase, but not vice versa. That is, misclassifying negative samples results in a RD cost increase. For this reason, a weighted scheme may be used in the machine-learning algorithm that assigns a unit weight for all positive samples and for negative samples, where the weights are proportional to the ratio of the RD cost increase caused by misclassifying a block to the mean RD cost increase in a video. This proportion may be controlled by a factor or value X, which controls the overall weight balance between positive samples and negatives samples, and thus affects the resulted classifier performance. During validation, if the classifier does not meet the threshold criteria (i.e., the response to the query at 908 is yes), the value for X may be adjusted. Then, the current classifier is retrained using the training dataset and the new value for X as described with regard to 812, which results in one or more adjusted classifier parameters for the classifier. Then, validation can be repeated. This iterative process of training followed by validation may be repeated until the current classifier meets the criteria.

More specifically, and referring again to FIG. 9, after the adjustment at 910, the process 900 may return to 904 to encode the blocks having the current block size using the modified classifier. The early termination error can be re-calculated at 906 and compared to the error threshold at 908. As long as the early termination error is greater than the error threshold in response to the query at 908, the sequence can be repeated after adjusting the parameters at 910. current When the early termination error is no higher than the error threshold, the response to the query at 908 is no. The process 900 ends after the current classifier is stored at 912.

Although the description above states that test for whether or not to retrain the current classifier is whether or not the early termination error is greater than the error threshold, this test may be modified as shown in FIG. 9. That is, it may be desirable to define a small positive value E that can be used to determine whether or not to retrain the classifier based on how close the early termination error is to the error threshold. If the early termination error is close to the error threshold (within a difference of E), retraining the classifier at 910 may be omitted or ended. Otherwise, i.e., where the early termination error is further away from the error threshold (|Early termination error−Error threshold|>E at 908), retraining the classifier at 910 occurs. This value E reflects that, in practice, convergence on a solution in the training using machine-learning process may be aided by flexibility in the result. The value E may be determined by experimentation, if used, and may differ or be the same for each classifier.

The process 900 is repeated for other classifiers, namely the $$\frac{N}{2} \times \frac{N}{2}$$

classifier (e.g., C32) and the $$\frac{N}{4} \times \frac{N}{4}$$

classifier (e.g., C16), utilizing the blocks with the same size in the validation dataset.

The adjustment scheme at the $$\frac{N}{2} \times \frac{N}{2} \text{ and } \frac{N}{4} \times \frac{N}{4}$$

levels similar to that described for the N×N level. Misclassifying a larger block generally brings about a greater cost increase. That is, if a larger block such as a 64×64 block is misclassified to be a non-partition block while it should be a partition block, more quality loss is incurred than if a smaller block such as a 32×32 block or a 16×16 block is misclassified. To ensure the encoding quality while speeding encoding, blocks with sizes 32×32 and 16×16 may be encouraged to early terminate more than the 64×64 blocks. A higher threshold for the classifier C32 is thus used. The error threshold for the classifier C32 may be 50% higher or more than the error threshold for the classifier C64.

Similarly, the error threshold for the classifier C16 greater than the error threshold for the classifier C64, and the error threshold for the classifier C16 may be equal to or greater than the error threshold for the classifier C32. The error threshold for the classifier C16 may be no more than 50% higher than the error threshold for the classifier C32 in an example.

In this example, a classifier is not trained for $$\frac{N}{8} \times \frac{N}{8}$$

blocks, but the smallest partition (i.e., prediction block) size is comprises $$\frac{N}{16} \times \frac{N}{16}$$

pixels. Therefore, features are not extracted for input to a classifier to determine whether or not to partition the $$\frac{N}{8} \times \frac{N}{8}$$

blocks.

Figure 12:
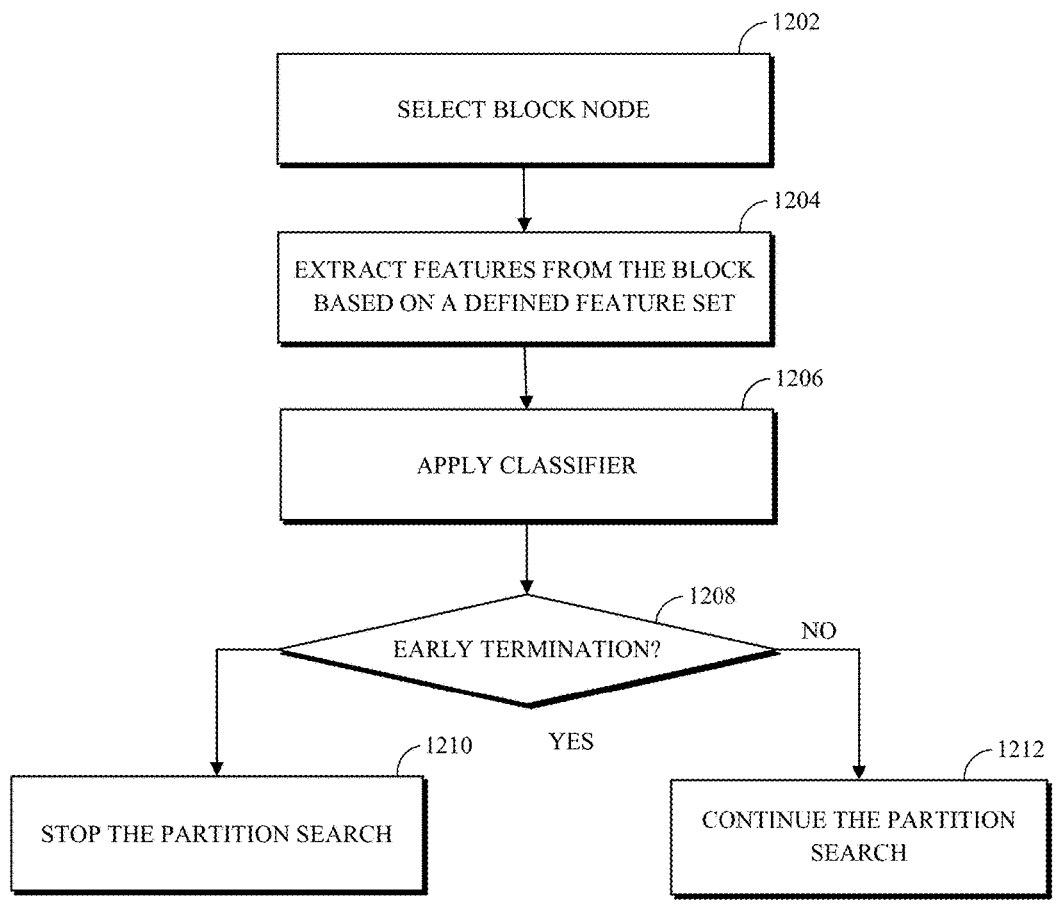
FIG. 12 is a flow chart diagram of a process for partitioning a frame during encoding in accordance with implementations of this disclosure.

When all classifiers are validated (and adjusted as applicable), they are be saved for use in encoding a sequence of video frames. FIG. 12 is a flow chart diagram of a process 1200 for partitioning a frame during encoding in accordance with implementations of this disclosure. The process 1200 may use the classifiers trained as described with regard to FIGS. 8 and 9. The process 1200 may be implemented by a processor, such as the processor 140 of FIG. 1, in conjunction with an encoder, such as the encoder 400 of FIG. 4. The process 1200 may be implemented by instructions, such as the instructions 160 of FIG. 1.

The process 1200 may be performed iteratively for blocks of a frame in the scan order, e.g., raster scan order. The process 1200 may be performed to evaluate each block of a block node starting at 1202. At 1202, a block node is selected as the current block node to be evaluated for partitioning. The block node may be the largest prediction block size such that a current block under consideration is a block having that size. For example, the block may be a block 610 as shown in FIG. 6. In this example, the block is a N×N block, where N=64.

Selecting the block node at 1202 also includes predicting the block forming the block node. Predicting the block can include generating a prediction block for each of a plurality of available prediction modes for the current block size, and producing a residual associated with each prediction block. The residuals may be respectively encoded and decoded using an encoder such as the encoder 400 described above. The prediction mode having the lowest error value may be selected as the best prediction mode for the current block at the block node.

At 1204, values for features are extracted from the block based on a defined feature set. The features are extracted for input to the classifier at the current block node. The features extracted may include those used to train the classifier. The features are desirably normalized at 1204. Normalizing the features at 1204 can include performing a standardization normalization as described above with regard to the normalization at 812 (e.g., using the mean and standard deviation values of the training instances). The values of the training dataset may be stored with the classifiers, or otherwise be made available to an encoder for performing the process 1200.

In performing standardization for each feature, the mean $\bar{x}_\iota$ and the standard deviation $\sigma_i$ for each feature dimension i are used. In the description above, the mean $\bar{x}_\iota$ and the standard deviation $\sigma_i$ are available before encoding due to the existence of the training or validation dataset, whichever is applicable. That is, for example, he mean $\bar{x}_\iota$ and the standard deviation $\sigma_i$ for each feature dimension i may be calculated using the training dataset before using the feature values extracted at 1204 as inputs to the classifier at 1206. However, in the process 1200, features are extracted sequentially from block in the frame as they are selected and considered at 1202 and 1204. In a variation of the standardization normalization described above, the value for a feature i may be used, together with the values for the feature i before the current block, if any, to calculate the mean $\bar{x}_\iota$ and the standard deviation $\sigma_i$ adaptively. That is, at each block node, the mean $\bar{x}_\iota$ and the standard deviation $\sigma_i$ may be newly calculated. The values used for the calculations may be limited to reduce the complexity for the calculations during the process 1200. For example, the values may be accumulated and used for normalization block-by-block while encoding a frame, and then be discarded at the start of encoding the next frame. Another technique to limit the calculations is to have a maximum number of values such that each new value increments the total until the maximum number is reached, before new values begin replacing old values (e.g., n first in-first out). Although less useful than using the mean and standard deviation values from the training dataset, this implementation of normalization may also be implemented in the preparation of the validation dataset at 902, encoding the blocks using the classifier at 904, or both.

After normalization at 1204, the classifier is applied at 1206 using the extracted features as input. The classifier in this example is the binary classifier C64. The output of a binary classifier may be a 0 or a 1. The output of the classifier determines whether or not the current block at the current block node is early terminated or not at 1208. If the output determines, based on the features, that partitioning of the block at the current block is to stop at 1208, the current partition and prediction mode is accepted as a final best choice for the video block partitioning. For example, the value 0 may indicate to partition a N×N block, while the value 1 indicates to not partition the block. The partition search stops at 1210. The process 1200 can then be repeated for the next N×N block in the scan order.

In contrast, if the output determines, based on the features, that partitioning of the current block is to continue at 1208, the process 1200 advances to 1212 to continue the partition search using the available partition modes. For example, the partition search for the N×N block may include partitioning the N×N block into vertical partition mode blocks, horizontal partition mode blocks, and split partition mode blocks. In the split partition mode, each sub-block may be evaluated using a lower block level classifier (here, C32 as an example) to determine whether or not to perform early termination. In this example, the split partition mode of the N×N block results in four $$\frac{N}{2} \times \frac{N}{2}$$

blocks, which each form a respective block node to repeat the process 1200 starting at 1202.

At the next block node, e.g., a $\frac{N}{2} \times \frac{N}{2}$ node, the features for the current block are extracted based on a defined feature set at 1204, and normalized. The features extracted for the block are used as inputs to the classifier at 1206 that corresponds to the current block size, here C32. The output of the classifier is used to make the early termination decision at 1208. If the output of the classifier indicates to stop the partition search, the process 1200 advances to 1210 to stop the partition search for the current block node. For example, where the $\frac{N}{2} \times \frac{N}{2}$ block at the block node is the first, second, or third block of the partitioned N×N block, the next block in the scan order is considered. Where the $\frac{N}{2} \times \frac{N}{2}$ block is the last block in the scan order, the process 1200 can then be repeated for the next N×N block in the scan order.

In contrast, if the output determines, based on the extracted features, that partitioning of the current block is to continue at 1208, the process 1200 advances to 1212 to continue the partition search using the available partition modes. The processing at 1212 may be performed the same as described above for the N×N block. That is, the partition search for a current $\frac{N}{2} \times \frac{N}{2}$ block may include partitioning the $\frac{N}{2} \times \frac{N}{2}$ block into vertical partition mode blocks, horizontal partition mode blocks, and split partition mode blocks. In this example, the split partition mode of the $\frac{N}{2} \times \frac{N}{2}$ block results in four $\frac{N}{4} \times \frac{N}{4}$ blocks, which each form a respective block node to repeat the process 1200 starting at 1202. Each of the four $\frac{N}{4} \times \frac{N}{4}$ blocks is considered in turn as a block node at 1202 before considering the next $\frac{N}{2} \times \frac{N}{2}$ block partitioned from the N×N block, or proceeding to the next N×N block if the last $\frac{N}{2} \times \frac{N}{2}$ block of the current N×N block has not yet been considered.

At the next block node, e.g., a $\frac{N}{4} \times \frac{N}{4}$ node, the features for the current block are extracted based on a defined feature set at 1204, and normalized. The features extracted for the block are used as inputs to the classifier at 1206 that corresponds to the current block size, here C16. The output of the classifier is used to make the early termination decision at 1208. If the output of the classifier indicates to stop the partition search, the process 1200 advances to 1210 to stop the partition search for the current block node. For example, where the $\frac{N}{4} \times \frac{N}{4}$ block at the block node is the first, second, or third block of the partitioned $\frac{N}{2} \times \frac{N}{2}$ block, the next block in the scan order is considered. Where the $\frac{N}{4} \times \frac{N}{4}$ block is the last block in the scan order, the process 1200 can then be repeated for the next N×N block in the scan order.

In contrast, if the output determines, based on the features, that partitioning of the current block is to continue at 1208, the process 1200 advances to 1212 to continue the partition search using the available partition modes. The processing at 1212 may be performed the same as described above for the N×N block. That is, the partition search for the current block may include partitioning the $\frac{N}{4} \times \frac{N}{4}$ block into vertical partition mode blocks, horizontal partition mode blocks, and split partition mode blocks. In this example, the split partition mode of the $\frac{N}{4} \times \frac{N}{4}$ block results in four $\frac{N}{8} \times \frac{N}{8}$ blocks. Each of the four $\frac{N}{8} \times \frac{N}{8}$ blocks may be further partitioned. However, there is no classifier for $\frac{N}{8} \times \frac{N}{8}$ blocks in this example, so the process 1200 is not repeated for the current block node. The $\frac{N}{8} \times \frac{N}{8}$ blocks may be conventionally partitioned using the vertical, horizontal, or split partition mode. As the smallest prediction block size, e.g., $\frac{N}{16} \times \frac{N}{16}$ pixels, is considered, further partitioning is not considered for whichever of the partition modes results in the lowest error value. Instead, processing returns to the next N×N block in the scan order.

The processing sequence described above for the process 1200 implements recursive partitioning of the blocks of a frame.

The multi-level error control scheme proposed herein controls quality loss and maximizes processing speed after performing machine learning-based early termination.

The level of error tolerance control may be adjusted adaptively for each classifier. To be more specific, a more strict error tolerance control may be implemented for a larger block classifier, e.g., C64, while keeping a relatively looser control in the lower block levels classifiers, e.g., C32 and C16. The search process follows a preorder depth—first traversal in which the parent node is evaluated before the child nodes. For example, a 64×64 block is evaluated before possibly going down the tree to further evaluate blocks with size 32×32 and 16×16. If a 64×64 block is misclassified to be a non-partition block but it actually should be a partition block, it causes more quality loss than misclassifying a 32×32 block or a 16×16 block. Therefore, to ensure encoding quality and speed up the partitioning, smaller blocks are encouraged to early terminate before larger blocks.

The words "example" or "aspect" are used herein to mean serving as an example, instance, or illustration. Any aspect or design described herein as "example" or "aspect" not necessarily to be construed as preferred or advantageous over other aspects or designs. Rather, use of the words "example" or "aspect" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term an "implementation" or "aspect" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the computing and communication devices such as a transmitting station and/or a receiving station (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the computing and communication devices do not necessarily have to be implemented in the same manner.

Further, in an implementation, for example, the computing and communication devices can be implemented using a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

A transmitting station implementing an encoder and a receiving station implementing a decoder can, for example, be implemented on computers in a real-time video system. Alternatively, a transmitting station can be implemented on a server and a receiving station can be implemented on a device separate from the server, such as a hand-held communications device. In this instance, the transmitting station can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by a transmitting station. Other suitable implementation schemes using the computing and communication devices are available. For example, a receiving station can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
generating, using recursive partitioning, encoded blocks by encoding a training video frame multiple times using different sets of encoding options, wherein the different sets of encoding options result from encoding the training video frame using different target bitrates;
for multiple encoded blocks encoded using the different sets of encoding options and having a first size:
extracting, from an encoded block having the first size, training values for block features from a defined feature set; and
associating a label with a training instance formed of the training values that indicates whether the encoded block having the first size is partitioned into smaller blocks; and
training a first classifier using the training instances for the multiple encoded blocks having the first size, the first classifier determining whether a first block having the first size is to be further partitioned during encoding using values for at least some of the block features obtained from the block.

2. The method of claim 1, wherein the defined feature set is based on a resolution of the training video frame.

3. The method of claim 1, further comprising:
normalizing, using a normalization scheme, the training values for respective ones of the block features before training the first classifier.

4. The method of claim 3, wherein the normalization scheme is a standardization normalization scheme.

5. The method of claim 1, further comprising:
for multiple encoded blocks having a second size:
extracting, from an encoded block having the second size, training values for block features from the defined feature set; and
associating a label with the training values that indicates whether the encoded block having the second size is partitioned into smaller blocks; and
training a second classifier using the training values and the associated labels for the multiple encoded blocks having the second size, the second classifier determining whether a second block having the second size is to be further partitioned during encoding using values for at least some of the block features obtained from the block.

6. The method of claim 5, wherein the second block is a partitioned block of the first block resulting from a split partition mode.

7. The method of claim 5, wherein a classifier parameter of the first classifier is associated with a first maximum allowed increase in error value resulting from early termination of partitioning blocks of a validation video frame having the first size, and a classifier parameter of the second classifier is associated with a second maximum allowed increase in error value resulting from early termination of partitioning blocks of the validation video frame having the second size, the first maximum allowed increase in error value lower than the second maximum allowed increase in error value.

8. The method of claim 1, further comprising:
preparing a validation dataset by encoding a validation video frame a first time using recursive partitioning;
encoding blocks of the validation video frame having the first size a second time while applying the first classifier to each block to determine to partition or not partition the block;
calculating an early termination error for the blocks of the validation video frame that terminate as a result of applying the first classifier and do not terminate while preparing the validation dataset; and
adjusting parameters of the first classifier by retraining the first classifier when the early termination error exceeds an error threshold.

9. The method of claim 8, wherein the early termination error is an increase in a rate-distortion cost of encoding the blocks of the validation video frame that terminate as a result of applying the first classifier and do not terminate while preparing the validation dataset over a lowest rate-distortion cost of encoding the blocks from the validation dataset.

10. The method of claim 1, further comprising:
encoding a video frame using the first classifier by, for each block of the video frame having the first size:
extracting features from the block based on the defined feature set;
apply the first classifier to the block using the extracted features; and
determine whether or not to stop a partition search for the block using an output of the first classifier.

11. The method of claim 1, wherein the first classifier is a binary classifier having a first output indicating that the first block having the first size is not to be further partitioned and a second output indicating that the first block having the first size is to be further partitioned.

12. An apparatus, comprising:
a non-transitory memory; and
a processor configured to execute instructions stored in the non-transitory memory to:
encode blocks of training video frames using recursive partitioning to generate encoded blocks;
generate training instances for the encoded blocks, each training instance comprising values of block features extracted from an encoded block and a label indicating whether or not the encoded block is partitioned into smaller blocks in the recursive partitioning; and
train classifiers for different block sizes, each classifier for a block size trained using the training instances associated with the block size as input to a machine-learning process, and each classifier configured to determine whether an input block is to be partitioned during encoding, wherein the processor is configured to generate the training instances by:
extracting, from the encoded blocks, the values of the block features from a defined feature set; and
normalizing the values for the training instances before training the classifiers.

13. The apparatus of claim 12, wherein the classifiers comprise a first classifier for a block size of 64×64 pixels, a second classifier for a block size of 32×32 pixels, and a third classifier for a block size of 16×16 pixels.

14. The apparatus of claim 12, wherein the processor is configured to generate the training instances by assigning a first value to the label when the training instance is associated with an encoded block that is not partitioned in the recursive partitioning.

15. An apparatus, comprising:
a non-transitory memory; and
a processor configured to execute instructions stored in the non-transitory memory to:
select a block of a video frame having a largest prediction block size;
encode the block without partitioning the block;
extract values from the block based on a predetermined feature set;
apply a first classifier, generated using a machine-learning process, to the block using the values as input, the first classifier being a binary classifier for blocks having the largest prediction block size, the binary classifier having a first output indicating to stop a partition search and a second output indicating to continue the partition search;
upon a condition that the first classifier produces the first output for the block, include the block encoded without partitioning in an encoded video bitstream; and
upon a condition that the first classifier produces the second output for the block, encode the block by partitioning the block according to a split partition mode for which a further partition search is possible and encode the block by partitioning the block according to at least one of a vertical or horizontal partition mode for which the further partition search is not possible.

16. The apparatus of claim 15, wherein the first classifier applied when the video frame has a first resolution is different from the first classifier applied when the video frame has a second resolution.

17. The apparatus of claim 15, wherein the processor is configured to normalize the values before using the values for input to the first classifier.

* * * * *